United States Patent
Kolev et al.

(10) Patent No.: US 11,256,751 B2
(45) Date of Patent: Feb. 22, 2022

(54) DOMAIN SPECIFIC LANGUAGE FOR CLOUD HOSTED SYSTEMS WITH METRIC-BASED STATE

(71) Applicant: SAP SE, Walldorf (DE)

(72) Inventors: Mitko Kolev, Walldorf (DE); Markus Muenkel, Hockenheim (DE); Venkata Narayana Papineni, Rauenberg (DE)

(73) Assignee: SAP SE, Walldorf (DE)

( * ) Notice: Subject to any disclaimer, the term of this patent is extended or adjusted under 35 U.S.C. 154(b) by 216 days.

(21) Appl. No.: 16/456,193

(22) Filed: Jun. 28, 2019

(65) Prior Publication Data
US 2020/0410009 A1    Dec. 31, 2020

(51) Int. Cl.
| | |
|---|---|
| G06F 7/00 | (2006.01) |
| G06F 16/9032 | (2019.01) |
| H04L 67/10 | (2022.01) |
| H04L 67/01 | (2022.01) |
| G06F 16/9038 | (2019.01) |
| G06F 16/953 | (2019.01) |
| G06F 16/23 | (2019.01) |
| G06F 16/2452 | (2019.01) |

(52) U.S. Cl.
CPC .... *G06F 16/90328* (2019.01); *G06F 16/2379* (2019.01); *G06F 16/2452* (2019.01); *G06F 16/9038* (2019.01); *G06F 16/953* (2019.01); *H04L 67/10* (2013.01); *H04L 67/42* (2013.01)

(58) Field of Classification Search
CPC ........... G06F 16/2379; G06F 16/90328; G06F 16/2452; G06F 16/9038; G06F 16/953; H04L 67/10

USPC ........................................ 707/722, 728, 760
See application file for complete search history.

(56) References Cited

U.S. PATENT DOCUMENTS

| | | |
|---|---|---|
| 7,620,937 B2 | 11/2009 | Papineni |
| 7,734,560 B2 | 6/2010 | Muenkel |
| 7,853,923 B2 | 12/2010 | Muenkel |
| 7,913,231 B2 | 3/2011 | Muenkel |
| 8,296,665 B2 | 10/2012 | Muenkel |

(Continued)

OTHER PUBLICATIONS

U.S. Appl. No. 10/843,751, Stienhans et al., Testing Pattern-Based Applications, filed May 11, 2004, 38 pages.

(Continued)

*Primary Examiner* — Md I Uddin
(74) *Attorney, Agent, or Firm* — Fish & Richardson P.C.

(57) ABSTRACT

Methods and systems are used for providing a domain specific language (DSL) for a cloud hosted system with metric-based state. As an example, a first DSL query request including first DSL query input based on a DSL is received. The first DSL query input is translated to a first set of query instructions based on the first DSL query input, translation rules metadata, and the DSL. The first set of query instructions is executed to retrieve, for each cloud system of a plurality of cloud systems, metrics data associated with an application state of an application deployed on each cloud system stored in a cloud deployment repository. A first set of response output is computed by matching the retrieved metrics data from the cloud deployment repository to the first DSL query input. A first DSL query response including the first set of response output is transmitted to a client system.

17 Claims, 7 Drawing Sheets

(56) References Cited

U.S. PATENT DOCUMENTS

2014/0372466 A1* 12/2014 Wong ................. G06F 16/2452
707/760
2019/0044909 A1 2/2019 Boller et al.
2020/0394654 A1* 12/2020 Concannon .......... G06Q 20/388

OTHER PUBLICATIONS

U.S. Appl. No. 10/843,753, Steinhans et al., Developing and Executing Applications With Configurable Patterns, filed May 11, 2004, 41 pages.

* cited by examiner

200

Receiving, by a domain specific language (DSL) query system, a first DSL query request including first DSL query input based on a DSL from a client system
202

Translating, by the DSL query system, the first DSL query input to a first set of query instructions based on the first DSL query input, translation rules metadata, and the DSL
204

Executing, by the DSL query system, the first set of query instructions as a complex query to retrieve, for each cloud system of a plurality of cloud systems in a cloud deployment, metrics data associated with an application state of an application deployed on each cloud system stored in a cloud deployment repository as retrieved metrics data
206

Computing, by the DSL query system, a first set of response output by matching the retrieved metrics data from the cloud deployment repository to the first DSL query input based on the first DSL query input and the DSL
208

Transmitting, by the DSL query system, a first DSL query response including the first set of response output to the client system
210

FIG. 2

DOMAIN SPECIFIC LANGUAGE FOR CLOUD HOSTED SYSTEMS WITH METRIC-BASED STATE

BACKGROUND

An enterprise may utilize a cloud monitoring system to monitor applications deployed in a cloud-computing environment for a variety of problems that may occur and may be associated with at least one of the deployed applications. The cloud-computing environment may include a large number of cloud hosted systems, such as, for example, hundreds, thousands, or more cloud hosted systems where the applications are deployed in the cloud-computing environment. Many and varied states may be associated with different applications, some of which may be problem states to be addressed by a system administrator.

SUMMARY

The present disclosure describes a domain specific language for cloud hosted systems with metric-based state.

In an implementation, a computer-implemented method is used for providing a domain specific language for a cloud hosted system with metric-based state. A first DSL query request including first DSL query input based on a DSL is received, by a domain specific language (DSL) query system, from a client system. The first DSL query input is translated, by the DSL query system, to a first set of query instructions based on the first DSL query input, translation rules metadata, and the DSL. The first set of query instructions is executed, by the DSL query system, as a complex query to retrieve, for each cloud system of a plurality of cloud systems in a cloud deployment, metrics data associated with an application state of an application deployed on each cloud system stored in a cloud deployment repository as retrieved metrics data. A first set of response output is computed, by the DSL query system, by matching the retrieved metrics data from the cloud deployment repository to the first DSL query input based on the first DSL query input and the DSL. A first DSL query response including the first set of response output is transmitted, by the DSL query system, to the client system. An update metrics data process is executed comprising: for each cloud system of the plurality of cloud systems, cloud system metrics data associated with the application state of the application deployed on each cloud system is retrieved from each cloud system of the plurality of cloud systems as retrieved cloud systems metrics data, and for each cloud system of the plurality of cloud systems, the metrics data stored in the cloud deployment repository is updated with the retrieved cloud systems metrics data, where the update metrics data process is executed periodically based on a programmable time period, a particular interval based on a programmable interval, or dynamically on demand. Translation of the first DSL query input further comprises: when the DSL query system determines that the first DSL query input includes a set of DSL elements based on the DSL: each DSL element of the set of DSL elements is translated to a subset of DSL element query instructions of the set of query instructions based further on a DSL element type of each DSL element, where the DSL element type comprises a metric-based DSL element type or a functional DSL element type, and when the DSL query system determines that the first DSL query input includes a set of literals of literal type search terms based on the DSL: each literal of the set of literals is translated to a subset of literal query instructions of the set of query instructions based further on each literal. The translation rules metadata includes at least one of: translation rules between a metric-based DSL element type DSL element associated with the DSL query input and a set of query instructions including search locations for metrics data for each cloud system of the plurality of cloud systems stored in the cloud deployment repository, translation rules between a functional DSL element type DSL element associated with DSL query input and a set of query instructions including search locations for the metrics data for each cloud system of the plurality of cloud systems stored in the cloud deployment repository, and translation rules between a literal associated with a literal type search term associated with the DSL query input and a set of query instructions including search locations for the literal in the cloud deployment repository. A second DSL query request including second DSL query input based on the DSL is received, by the DSL query system, from the client system and an auto-completion indicator indicating that auto-completion results are to be returned for the second DSL query input, and when the DSL query system determines that a portion of the second DSL query input matches a particular metric name in a particular metric evaluation of a set of metric evaluations, where each metric evaluation of the set of metric evaluations includes a metric name of an associated metric, a set of possible metric values of the associated metric, and a set of metric query instructions including search locations for metrics data of the associated metric for each cloud system of the plurality of cloud systems stored in the cloud deployment repository: the set of metric query instructions of the particular metric evaluation is executed, by the DSL query system, to retrieve metric evaluation data stored in the cloud deployment repository as retrieved metric evaluation data, a set of metric-based DSL elements is computed by matching the particular metric name and each possible metric value of the set of possible metric values to the retrieved metric evaluation data, and an auto-completion DSL query response including the set of metric-based DSL elements is transmitted to the client system. A second DSL query request including second DSL query input based on the DSL is received, by the DSL query system, from the client system and an auto-completion indicator indicating that auto-completion results are to be returned for the second DSL query input, and when the DSL query system determines that a portion of the second DSL query input matches a particular function name in a particular function of a set of functions, where each function of the set of functions includes a function name, a set of possible function output values, and a set of function query instructions including search locations for metrics data associated with each function for each cloud system of the plurality of cloud systems stored in the cloud deployment repository: the set of function query instructions of the particular function is executed, by the DSL query system, to retrieve function evaluation data stored in the cloud deployment repository as retrieved function evaluation data, a set of functional DSL elements is computed by matching the particular function name and each possible function output value of the set of possible function output values to the retrieved function evaluation data, and an auto-completion DSL query response including the set of functional DSL elements is transmitted to the client system. A second DSL query request including second DSL query input based on the DSL is received, by the DSL query system, from the client system and an auto-completion indicator indicating that auto-completion results are to be returned for the second DSL query input, a set of customer query instructions is executed, by the DSL query system, to retrieve customer data stored in the cloud deployment repository as retrieved customer data, where the customer data includes a set of customers, each customer of the set of customers includes a customer name, a set of customer names is computed by matching the second DSL query input to a portion of a customer name of each customer of the set of customers in the retrieved customer data, and an auto-completion DSL query response including the set of customer names is transmitted to the client system.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, to simplify the access to data, the complexity of accessing the data may be handled by the provider of the data instead of by the consumers of the data. Second, a domain specific language for a cloud hosted system with metric-based state is provided to reduce the complexity of systems used for monitoring or management of cloud systems. Third, a domain specific language for a cloud hosted system with metric-based state for a query system may be utilized by analytics solutions to reduce the complexity of the analytics solutions.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 2 is a flowchart illustrating an example of a computer-implemented method for providing a domain specific language for a cloud hosted system with metric-based state, according to an implementation of the present disclosure.

Like reference numbers and designations in the various drawings indicate like elements.

DETAILED DESCRIPTION

Figure 1:
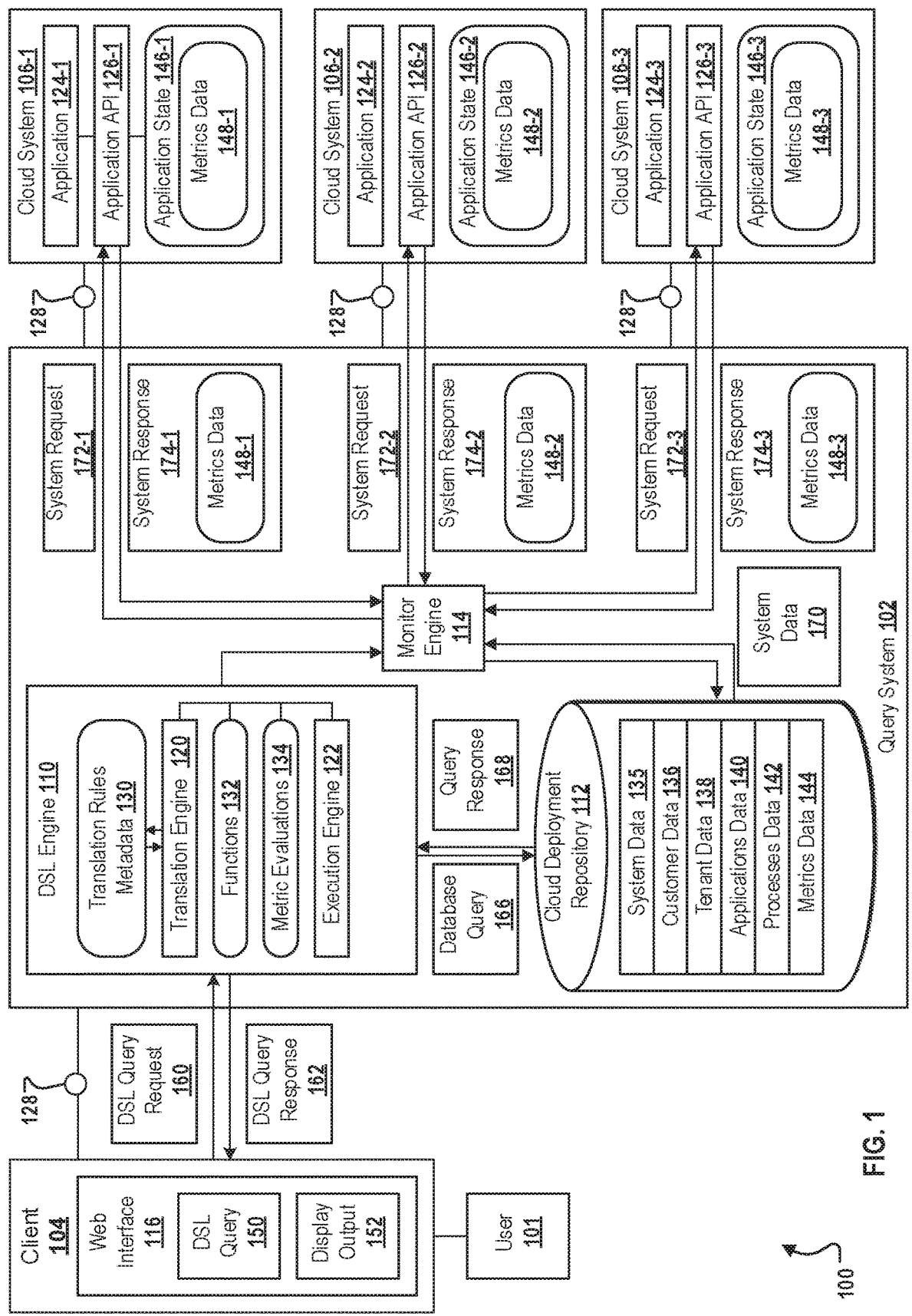
FIG. 1 is a block diagram illustrating an example distributed computing system (DCS) for providing a domain specific language for a cloud hosted system with metric-based state for a query system, according to an implementation of the present disclosure.

The following detailed description describes a domain specific language for a cloud hosted system with metric-based state, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Due to a variety of problems that may occur in cloud-computing environments and may be associated with one or more applications deployed in corresponding cloud hosted systems in the cloud-computing environment, it may be difficult to determine which of the applications on which of the cloud hosted systems are associated with a particular problem due to a number of possible states that an associated application may be in when the particular problem occurred. The number of possible states may comprise a set of conditions on corresponding sets of metrics and a range of values for each corresponding metric. For a particular problem, the number of metrics may be high and each metric may have a wide range of possible values per metric, which would result in the number of possible states being high. The cloud-computing environment may include a large number of cloud hosted systems, such as, for example, hundreds, thousands, or more cloud hosted systems where the applications are deployed in the cloud-computing environment.

For the purposes of this disclosure, a cloud monitoring, or management system to monitor or manage applications deployed in a cloud-computing environment may include a search capability. To determine which of the applications on which of the cloud hosted systems are associated with a particular problem, it may require a search be performed for all applications in the number of possible states including the set of conditions on the corresponding sets of metrics and the range of values for each corresponding metric to find all of the applications on their corresponding cloud hosted systems that may be in the number of possible states associated with the particular problem.

In a typical approach, a cloud monitoring or management system may utilize classical web services, such as, for example, plain representational state transfer (REST) services, which may have a particular structure of resources and information about each resource may be retrieved and/or accessed using get, post and delete methods. Another typical approach may utilize an open data protocol (OData) for building and consuming RESTful application programming interfaces (APIs), to query parameters to a domain model. These approaches may be loosely coupled, light-weight web services spread out across a network, such as the internet. However, in these typical approaches, it may be difficult to exclude, or filter out, false positive matches and find the real applications and their corresponding cloud hosted systems, because each individual user may have to create a data structure to match what is requested. It may also be difficult for each user to map a desired state to the data structure. Due to the complexity, it is often the case that false positive results are delivered. It may also be hard to track by analytics solutions what may be the intention of the user. To exclude the false positive matches in this approach, a monitoring or management system may need to model complex search filters. In these typical approaches, it may be difficult to filter and/or combine these resources, and if these resource can be combined, making them human understandable may also be difficult and complex.

These REST and OData approaches are also not very intuitive in making the determination of which resources may be filtered and which may be combined non-obvious, challenging, or not even possible. In a typical search engine, such as, Google, for example, the objects being searched include websites, images, videos, and other types of objects. The search engine searches a set of stored results that have been determined prior to a search and/or a query. The search engine utilizes web crawlers to determine which web pages exist at a particular time, indexes those web pages, and stores the indexed web pages. Based on the stored indexed web pages, the search engine may perform searches over these indexed web pages. The search engine, essentially already has the data and information prior to performing the search and relies on this data and information to have been already collected.

In contrast to a typical cloud monitoring system and typical search capabilities, a domain specific language (DSL) for a cloud hosted system (also referred herein as a cloud system) with metric-based state is disclosed herein. The DSL may be utilized to query applications deployed in a large cloud-computing environment to identify applications that may be having issues or that may be in a particular application state. The application state of an application may be used to determine whether the application is running as expected.

The DSL query system provides a web service interface that is simple and provides an easy way to query information and data about the cloud systems in a cloud system deployment in real-time. The DSL query system retrieves data from each cloud system of a plurality of cloud systems in real-time and does not rely on stored results. The DSL may be human-readable and may be based on metrics to simplify the definition of a particular application state to be searched. The DSL query system indexes the type of the cloud systems and the types of metrics associated with the application states of corresponding applications on each of the cloud systems. The DSL query system utilizes APIs to provide which customers and tenants exist and which applications exist on which cloud systems.

An example DSL query system may include a DSL engine, a cloud deployment repository, and a monitor engine. The DSL engine may include query-side web interface functionality. A web interface is a client-side web interface that may be installed on an example client system, or otherwise made available to the client system. The DSL query system may utilize a single endpoint that may receive DSL query input and utilizes different resources and get and retrieve methods, which may enable a user to get and retrieve information about multiple resources in a simple and human understandable way.

The DSL and the DSL query system may also enable a user to filter and combine information about these resources that is simple and human understandable. The DSL allows a user to define one or more particular aspects of a particular problem in the cloud systems in a cloud deployment in one or more DSL search terms and/or DSL elements, combine each of the one or more DSL search terms and/or DSL elements into DSL query input of a DSL query, issue the query, filter DSL query results based on the users simple or complex filter criteria, and receive detailed systems to achieve high quality results, while still being simple. The DSL query is simple, there may be only one connection between a user on a client system and the DSL query system, or between the DSL query system and each cloud system of a plurality of cloud systems, and may only be a single domain object.

The monitor engine may retrieve metrics data associated with an application state for each corresponding cloud system in a plurality of cloud systems in a cloud-computing environment based on system data stored in the cloud deployment repository. The monitor engine may store the metrics data associated with the application state for each corresponding cloud system in the plurality of cloud systems in the cloud deployment repository. Applications deployed on the plurality of cloud systems in the cloud-computing environment may utilize an application metrics application programming interface (API) to store their application state metrics data on each cloud system of the plurality of cloud systems they are deployed on and/or to allow the monitor engine to retrieve the application state including the metrics data from each cloud system of the plurality of cloud systems.

A user may enter a DSL query based on the DSL using the web interface, which may be sent by the client system to the query system. The DSL engine of the query may receive the DSL query from the web interface. The DSL engine may translate the DSL query to a complex set of query instructions based on the DSL query and translation rules. The DSL engine may execute the complex set of query instructions as a complex repository query to retrieve a corresponding set of metrics data from the cloud deployment repository. The retrieved set of metrics data may be associated with at least one cloud system of the plurality of cloud systems. The DSL engine may compute a set of response output in a DSL query response based on the set of metrics data and the set of DSL elements in the DSL query. The DSL query response may be human-read-able. The DSL engine may transmit the DSL query response back to the web interface on the client system in response to the DSL query. The web interface may display the DSL query response so that the user may see which applications are having issues and/or may be in a particular state.

Using DSL as the DSL query language enables a user to express human-readable, complex search queries for application state in a simple way. This DSL approach simplifies the interaction with the data. Client applications may send search queries based on the DSL to access metrics and system data, which does not require sending data structures to access this information. The DSL approach has at least one or more of the following advantages. First, sending search queries based on the DSL does not require the client applications to map the data structures to data in the client applications. Second, the complexity of computing and mapping a retrieved set of metrics data to a DSL query response is done once in the query server during processing of the DSL query rather than every client application having to do this. Third, the DSL is human readable and a human can understand the semantics of a DSL query much easier than a data structure. Fourth, a user may add new DSL elements, functional DSL elements, to the DSL query system for complex DSL queries, which work like the rest of the DSL in the DSL query system.

FIG. 1 is a block diagram illustrating an example distributed computing system (DCS) 100 for providing a domain specific language for a cloud hosted system with metric-based state, according to an implementation of the present disclosure. At a high level, the illustrated DCS 100 includes or is made up of one or more communicably coupled computers or other components (see FIG. 7) that communicate across a network 128 (e.g., operating within a cloud-computing-based environment). The illustrated DCS 100 includes a query system 102, a client system 104, a plurality of cloud systems 106 including cloud systems 106-1, 106-2, and 106-3, a DSL engine 110, a cloud deployment repository 112, a monitor engine 114, a web interface 116, a translation engine 120, an execution engine 122, and applications 124 including applications 124-1, 124-2, and 124-3 deployed on cloud systems 106-1, 106-2, 106-3, respectively. Although the detailed description is focused on DSL query functionality, other functionality is envisioned to be covered by the described subject matter. Discussion of DSL query functionality is not intended to limit the detailed description to only DSL query functionality and/or to limit the detailed description in any way.

The DSL may be utilized as a DSL query language by a user 101 to express complex search queries for application state and/or other data in a simple human-readable way. The DSL has a grammar, which may be a context-free grammar and may be described in Backus-Naur form (BNF) (also referred to as Backus-Normal form (BNF)). In one or more embodiments, the DSL may be described in Extended Backus-Naur form (EBNF), or another human-readable form. The DSL grammar described in BNF is shown in the DSL Grammar Table 1.

a cloud system, such as, for example, cpu, cpu load, cpu usage, cpu performance, Disk I/O, Disk space, Disk utilization, memory, I/O, network, network latency, resource, database, application, system, process, or another type of aspect of the cloud system. A metric may have a value and a description of value space, which describes the range of possible values of the metric. The metric may also include a numeric value and a numeric range of possible numeric values of the metric. A set of metrics utilized in the query system 102 and/or in the cloud systems 106 in the cloud deployment may be dynamic and the set of metrics may change over time, such as, for example, an application 124 may introduce a new metric that would then be added to the set of metrics. For a metric-based DSL element, the scope may be the metric name and the value may include ok, warning, or critical, or other appropriate values.

A functional DSL element may include a pair of an alphanumeric name, which may be utilized for identification, and a function, which may output a set of values. The set of values output by the function may be an empty set. When the set of values is non-empty, the functional DSL element may be expanded into a corresponding set of functional DSL elements, where the scope of each functional DSL element of the set of functional elements may be the function, which may be the name of the function, and the value of each functional DSL element of the set of functional elements may be the particular corresponding value of the set of values output by the function. An output value of a function may include ok, warning, or critical, or other appropriate values.

An example of a valid query with metric-based DSL elements may be:

cpu:critical diskspace:critical

In this example, there are two metric-based DSL elements including "cpu:critical" and "diskspace:critical". The scope of the first DSL element is "cpu" and the value is "critical". After this query is evaluated by the query system 102, the response to the query would include all applications deployed in the plurality of cloud systems 106 that have both metrics "cpu" and "diskspace" having a value of critical. In another example, a valid query with a functional DSL element may be:

| DSL Grammar Table 1 | |
|---|---|
| Digit excluding zero | = "1" | "2" | "3" | "4" | "5" | "6" | "7" | "8" | "9" ; |
| digit | = "0" | digit excluding zero; |
| number | = ["-"] digit excluding zero {digit} [",", {digit}]; |
| string | = alphabetic character, {alphabetic character}; |
| alphanumeric | = alphabetic character, {alphabetic character | digit}; |
| scope | = string; |
| value | = alphanumeric | number; |
| exclusion | = "-"; |
| DSL element | = Scope, ":", value; |
| and | = " "; |
| or | = "or"; |
| literal | = (alphabetic character | digit), {alphabetic character | digit}; |
| phrase | = """literal, {literal}"""; |
| searchTerm | = [exclusion] literal | [exclusion] phrase | [exclusion] DSL element |
| query | = searchTerm { (and | or) searchTerm }; |

The DSL may comprise at least one DSL element and the DSL grammar described in DSL Grammar Table 1 shows how to build a valid search query. A DSL element may have scope and value. There may be two types of DSL elements including a metric-based DSL element and a functional DSL element. A metric-based DSL element may be associated with a metric. A metric may show a particular state aspect of alerts:critical In this example, there is only one functional DSL element including "alerts:critical". The scope of this functional DSL element is "alerts", which is the name of the function, and the value is "critical", which is one of the possible values that may be output/returned by the "alerts" function. After this query is evaluated by the query system 102 including the "alerts" function having been evaluated, the response to the query would include all resources that have "alert" with a value of "critical", where a resource may be a particular cloud system 106 of the plurality of cloud systems 106, a database in the plurality of cloud systems 106, an application deployed in a particular cloud system 106, or another type of resource.

A query may also include a literal, for example, a name of a metric, such as "cpuload", a name of a function, such as "alerts", a name of a state, such as "critical", a name of a customer, or another identifier associated with the cloud deployment. The literal may also be only a portion of a name of a metric, such as "cpulo", a portion of a name of a function, such as "alert", a portion of a name of a state, such as "crit", a portion of a name of a customer, or a portion of another identifier associated with the cloud deployment. When the query system 102 evaluates the query, the query system 102 may match the literal to at least a portion of a name of a metric, a name of a function a name of a state, a name of a customer, or another identifier associated with the cloud deployment.

A query search including at least one of a metric-based DSL element, a functional DSL element, a literal, or another type of search term, may result in the query system 102 only returning a set of query results that are currently available in the query system 102 and/or in cloud systems in the plurality of cloud systems based on complete or partial matches. For example, for a query search with query input of "cpuload: critical", the set of query results returned by the query system 102 would be an empty set if no cloud system in the plurality of cloud systems had an application state with a metric name of "cpuload" and the metric value of "critical".

The query system 102 may be any computing device operable to connect to and/or communicate with at least the client system 104, a plurality of cloud systems 106, the web interface 116 of the client system 104, and/or the applications 124 (or components interfacing with any of these—whether or not illustrated). The query system 102 may comprise a single endpoint. The query system 102 may further comprise one or more endpoints including at least a find DSL elements endpoint at the DSL engine 110 of the query system 102, an application count endpoint at the DSL engine 110 of the query system 102, a DSL query endpoint at the DSL engine 110 of the query system 102, other endpoints at the DSL engine 110 of the query system 102, or other endpoints at the query system 102. As illustrated, the query system 102 connects or interfaces to a single client system 104. In other instances, the query system 102 may connect to a plurality of client systems 104, where appropriate. In general, the query system 102 comprises an electronic computing device operable to receive, transmit, process, and store any appropriate data associated with the DCS 100. In a number of embodiments, the query system 102 may be a component of a cloud monitoring system, a cloud operation cockpit, an application, or a management application, or comprise a cloud monitoring system, a cloud operation cockpit, an application, or a management application.

The client system 104 may be any computing device operable to connect to and/or communicate with at least the query system 102, and/or the DSL engine 110 (or components interfacing with any of these—whether or not illustrated). As illustrated, the client system 104 connects or interfaces to the query system 102 at the single DSL query endpoint at the DSL engine 110 of the query system 102. The client system 104 may also connect or interface to at least the find DSL elements endpoint at the DSL engine 110 of the query system 102, the application count endpoint at the DSL engine 110 of the query system 102, other endpoints at the DSL engine 110 of the query system 102, or other endpoints at the query system 102. In general, the client system 104 comprises an electronic computing device operable to receive, transmit, process, and store any appropriate data associated with the DCS 100. There may be any number of client systems 104 associated with, or external to, the DCS 100.

The web interface 116 operates with the DSL engine 110 to query application states 146 of corresponding applications 124 deployed in cloud systems 106 to identify any of the applications 124 that may be having issues or that may be in a particular application state 146 based on associated metrics data 148. The web interface 116 may comprise a graphical user interface (GUI) including a search box, such as, for example, a DSL query interface 150, and a display area, such as, for example, a display output 152. A user 101 may enter DSL query input in human-readable form, such as, for example a string of text, in the DSL query interface 150. The user 101 may see the results of the DSL query at the display output 152. The user 101 may also see auto-completion results of the DSL query at the DSL query interface 150 when auto-completion functionality is enabled and/or selected by the user 101.

In one or more embodiments, the web interface 116 may further comprise a trusted secure interface between the web interface 116 and the DSL engine 110. In one or more embodiments, the web interface 116 may comprise one or more authenticated representational state transfer (REST) calls from the web interface 116 to the DSL engine 110. The one or more authenticated REST calls may include a find DSL elements endpoint at the DSL engine 110, an application count endpoint at the DSL engine 110, a DSL query endpoint at the DSL engine 110, other endpoints at the DSL engine 110, or other endpoints at the query system 102. The web interface 116 may be application agnostic and may provide a minimal set of functionality needed to support authentication and communication with the DSL engine 110. In particular, the minimal set of functionality provided by the web interface 116 may include, for example, user authentication at the DSL engine 110, management of security data, such as, open authorization (OAuth) refresh and access tokens provided by an OAuth server (not illustrated in FIG. 1), exchange of DSL query request data and DSL query response data. The web interface 116 may provide security data in a DSL query request 160. The security data may include an OAuth access token which the DSL engine 110 may utilize for authenticating the web interface 116.

Each cloud system 106 of the plurality of cloud systems 106 may be any computing device operable to connect to and/or communicate with at least the query system 102, and/or DSL engine 110, and/or monitor engine 114, (or components interfacing with any of these—whether or not illustrated). As illustrated, each cloud system 106 connects or interfaces to the query system 102 and monitor engine 114. In other instances, each cloud system 106 may connect or interface to the DSL engine 110, where appropriate. In general, each cloud system 106 comprises an electronic computing device operable to receive, transmit, process, and store any appropriate data associated with the DCS 100. There may be any number of cloud systems 106 associated with, or external to, the DCS 100.

Each cloud system 106 may include an application 124 and an applications application programming interface (API) 126. Each application 124 and each applications API 126 may be deployed to and installed on a corresponding cloud system 106. As illustrated, cloud system 106-1 includes application 124-1 and applications API 126-1, cloud system 106-2 includes application 124-2 and applications API 126-2, and cloud system 106-3 includes application 124-3 and applications API 126-3. Applications 124-1, 124-2, and 124-3 may be homogenous applications having the same functionality. In other instances, each cloud system 106 may include one or more other applications, where each of the one or more other applications may be homogeneous applications.

Each application 124 operates with the corresponding application API 126 to establish and maintain corresponding application state 146 including metrics data 148 at the corresponding cloud system 106 of the plurality of cloud systems 106. The application state 146 including the metrics data 148 may represent the state of the corresponding application 124 in real-time. The metrics data 148 may include at least one of a customer identification (ID) associated with a customer of the corresponding application 124, a tenant ID associated with a tenant of the corresponding application 124, an application link associated with the corresponding application 124, an application ID associated with the corresponding application 124, a process ID associated with a process of the corresponding application 124, and a set of metrics associated with the corresponding application 124. Each metric of the set of metrics may show a particular state aspect of the cloud system 106 that the corresponding application 124 is deployed on and may include a value and a range of possible values of the metric, and a numeric value and a numeric range of possible numeric values, as previously described. Each metric of the set of metrics may further include at least one of an associated metric ID and an associated metric name.

The cloud deployment repository 112 may include system data 135 associated with the plurality of cloud systems 106 including at least a list of cloud systems 106 in the cloud deployment, where each of the list of cloud systems 106 may include at least one of a cloud system name, a cloud system ID, a cloud system status, and security data to establish and maintain communication between the monitor engine 114 and the corresponding cloud system 106 based on at least the application API 126 of the corresponding cloud system 106.

The cloud deployment repository 112 may also include customer data 136 including at least a list of customers, where each customer of the list of customers may include at least one of a customer name, a customer ID, and at least one application ID of a corresponding application that may be deployed in the plurality of cloud systems 106, such as, for example, at least application 124.

The cloud deployment repository 112 may further include tenant data 138 including at least one of at least one list of tenants that exist in the cloud deployment and at least one application ID of a corresponding application associated with the at least one list of tenants, where each tenant of the at least one list of tenants includes at least one of a tenant name and a tenant ID.

The cloud deployment repository may also include applications data 140 including at least a list of applications that may be deployed in the plurality of cloud systems 106, where each of the list of applications may include at least one of a link to the application, an application name, and an application ID. The cloud deployment repository 112 may further include process data 142 including at least one of at least one list of processes and at least one application ID of a corresponding application associated with the at least one list of processes, where each process of each of the at least one list of processes includes a process name and a process ID.

The cloud deployment repository 112 may also include metrics data 144 including, for each cloud system 106 of the list of cloud systems 106, at least one of at least one set of metrics, at least one application ID of a corresponding application deployed on the cloud system 106 and associated with the at least one set of metrics, at least one customer ID associated with a corresponding customer of the at least one application ID, at least one tenant ID associated with a corresponding tenant of the at least one application ID, and at least one process ID associated with a corresponding process of the at least one application ID. Each metric of the at least one set of metrics may further include an associated metric ID, an associated metric name, a value and a range of possible values of the metric, and a numerical value and a numerical range of possible numeric values of the metric.

The cloud deployment repository 112 may further comprise a database and a set of database access functions. The DSL query system 102 may leverage the data and knowledge about which cloud systems 106, customers, tenants, and applications 124 including the associated processes and metrics exist in the cloud deployment to allow this information and data to be organized and stored in the cloud deployment repository 112 as an indexed data structure. The cloud deployment repository 112 may utilize this data and knowledge to organize and store the system data 135, the customer data 136, the tenant data 138, the applications data 140, the processes data 142, and the metrics data 144 in the database as an indexed data structure, which exposes a certain set of metrics having certain value ranges. The indexed data structure may comprise a hypercube structure, or another appropriate data structure. The cloud deployment repository 112 may also allow the data in the cloud deployment repository 112 to be searched, updated, retrieved, and/or accessed using other database access functionality.

The cloud deployment repository 112 may comprise a relational database, such as, for example, a Microsoft SQL server relational database management system, an open data protocol (OData) based database, a representational state transfer (REST) based database, or another type of database system. The cloud deployment repository 112 including the system data 135, the customer data 136, the tenant data 138, the applications data 140, the processes data 142, and the metrics data 144 may be configured, initialized, and maintained during a configuration process, an initialization process, and/or a maintenance process.

The monitor engine 114 may operate with each application API 126 to monitor and retrieve the application state 146 including metrics data 148 of the corresponding application 124 deployed in the corresponding cloud system 106. Monitor engine 114 may comprise a set of trusted secure interfaces, where each trusted secure interface of the set of trusted secure interfaces is between monitor engine 114 and each application API 126 of each corresponding cloud system 106. In one or more embodiments, monitor engine 114 may comprise a set of authenticated representational state transfer (REST) calls from the monitor engine 114 to each application API 126 of each corresponding cloud system 106.

The monitor engine 114 may be application agnostic and may provide a minimal set of functionality needed to support authentication and communication with each application API 126 of each corresponding cloud system 106. In particular, the minimal set of functionality provided by the monitor engine 114 may include, for example, user authentication at each application API 126 of each corresponding cloud system 106, management of security data, such as, open authorization (OAuth) refresh and access tokens provided by an OAuth server (not illustrated in FIG. 1), exchange of system request data and system response data. The monitor engine 114 may provide security data in each system request 172. The security data may include an OAuth access token which each application API 126 of each corresponding cloud system 106 may utilize for authenticating the monitor engine 114.

During operation at initialization time, configuration time, maintenance time, or update time, monitor engine 114 may perform an update metrics data process to update the metrics data 144 associated with each cloud system 106 of the plurality of cloud system 106 stored in the cloud deployment repository 112 with the metrics data 148 maintained on each cloud system 106 of the plurality of cloud systems based on the system data 135 in the cloud deployment repository 112. During the update metrics data process, monitor engine 114 may determine the status of each cloud system 106 in the plurality of cloud systems 106. For each cloud system 106 in the plurality of cloud systems 106, monitor engine 114 may: generate a status request including at least the security data of the corresponding cloud system 106 and transmit the status request to the corresponding cloud system 106 using the established communication to the corresponding application API 126.

The corresponding application API 126 may receive the status request and authenticate using the security data of the cloud system 106. The corresponding application API 126 may determine the status of the corresponding cloud system 106. The status of a cloud system 106 may be alive, down, or another appropriate status. The corresponding API 126 may generate a status response including the status of the corresponding cloud system 106. The corresponding application API 126 may transmit the status response to the monitor engine 114.

The monitor engine 114 may receive the status response from the corresponding cloud system 106. If the monitor engine 114 does not receive the status response from the corresponding cloud system 106 after a period of time, the monitor engine 114 may determine that the corresponding cloud system 106 is non-responsive and the status of the corresponding cloud system 106 is down. In one or more embodiments, the monitor engine 114 may retry the status request a number of times until a non-responsive threshold count is exceeded. Once the non-responsive threshold count is exceeded, the monitor engine 114 may determine that the corresponding cloud system 106 is non-responsive and the status of the corresponding cloud system 106 is down. The monitor engine 114 may store the status of the corresponding cloud system 106 in the cloud system status of the corresponding cloud system 106 in the list of cloud systems 106 in the system data in the cloud deployment repository 112.

Monitor engine 114 may retrieve metrics data 148 associated with an application state 146 from each corresponding cloud system 106 having a cloud system status of alive in the plurality of cloud systems 106 in the cloud-computing environment based on system data 135 stored in the cloud deployment repository 112. For each cloud system 106 in the list of cloud systems 106 in the system data 135 having a cloud system status of alive, monitor engine 114 may: generate a system request 172 including at least one of an application ID associated with the corresponding application state 146 and the security data for the corresponding cloud system 106, and transmit the system request 172 to the corresponding cloud system 106 using the established communication to the corresponding application API 126. As illustrated, monitor engine 114 generates and transmits system request 172-1 to cloud system 106-1 using established communication to application API 126-1. Similarly, monitor engine 114 generates and transmits system request 172-2 to cloud system 106-2 using established communication to application API 126-2, and monitor engine 114 generates and transmits system request 172-3 to cloud system 106-3 using established communication to application API 126-3.

The corresponding application API 126 may receive the system request 172. The corresponding application API 126 may calculate and/or collect the metrics data 148 of the corresponding application state 146 associated with application 124 based on the application ID in the system request 172 in real-time. The corresponding API 126 may generate a system response 174 including the calculated and/or collected metrics data 148 of the corresponding application state 146. The corresponding application API 126 may transmit the system response 174 to the monitor engine 114.

As illustrated, application API 126-1 receives system request 172-1, calculates and/or collects metrics data 148-1 of application state 146-1 associated with application 124-1, generates system response 174-1 including metrics data 148-1, and transmits the system response 174-1 to the monitor engine 114. Similarly, application API 126-2 receives system request 172-2, calculates and/or collects metrics data 148-2 of application state 146-2 associated with application 124-2, generates system response 174-2 including metrics data 148-2, and transmits the system response 174-2 to the monitor engine 114, and application API 126-3 receives system request 172-3, calculates and/or collects metrics data 148-3 of application state 146-3 associated with application 124-3, generates system response 174-3 including metrics data 148-3, and transmits the system response 174-3 to the monitor engine 114.

The monitor engine 114 may receive each system response 174 from the corresponding cloud system 106. The monitor engine 114 may store the metrics data 148 of each system response 174 in the respective corresponding metrics data 144 in the cloud deployment repository 112 based on the metrics data 148, the application ID associated with the corresponding application state 146 and the metrics data 148, and the cloud system ID associated with the corresponding cloud system 106. As illustrated, monitor engine 114 receives system response 174-1 from cloud system 106-1 and stores metrics data 148-1 of system response 174-1 in the corresponding metrics data 144 in the cloud deployment repository 112 based on the metrics data 148-1, the application ID associated with the application state 146-1 and the metrics data 148-1, and the cloud system ID associated with the cloud system 106-1. Similarly, monitor engine 114 receives system response 174-2 from cloud system 106-2 and stores metrics data 148-2 of system response 174-2 in the corresponding metrics data 144 in the cloud deployment repository 112 based on the metrics data 148-2, the application ID associated with the application state 146-2 and the metrics data 148-2, and the cloud system ID associated with the cloud system 106-2, and monitor engine 114 receives system response 174-3 from cloud system 106-3 and stores metrics data 148-3 of system response 174-3 in the corresponding metrics data 144 in the cloud deployment repository 112 based on the metrics data 148-3, the application ID associated with the application state 146-3 and the metrics data 148-3, and the cloud system ID associated with the cloud system 106-3. When more than one application is deployed to the corresponding cloud system 106, the process may be repeated until the metrics data 148 associated with each of the more than one applications is retrieved from the corresponding cloud system 106 and stored in the cloud deployment repository 112.

The DSL engine 110 may be installed on the query system 102 and may include the query-side of the web interface 116. The DSL engine 110 may support one or more endpoints including a find DSL elements endpoint, an application count endpoint, a DSL query endpoint at the DSL engine 110, or other endpoints at the DSL engine 110. These endpoints may be REST endpoints and may be utilized by the web interface 116, as previously described. The find DSL elements endpoint may find all metric-based and functional DSL elements, the application count endpoint may count the number of applications by a DSL query, and the DSL query endpoint may find the applications with state defined by a DSL query. The DSL engine 110 may include at least one of translation rules metadata 130, functions 132, and metric evaluations 134.

The translation rules metadata 130 may include at least one of translation rules between a metric-based DSL element type DSL element associated with the DSL query input and a set of query instructions including search locations for metrics data 144 for each cloud system 106 of the plurality of cloud systems 106 stored in the cloud deployment repository 112 based on at least one of the metric-based DSL element, the DSL, and structure of the cloud deployment repository 112, translation rules between a functional DSL element type DSL element associated with DSL query input and a set of query instructions including search locations for the metrics data for each cloud system 106 of the plurality of cloud systems 106 stored in the cloud deployment repository 112 based on at least one of the functional DSL element, the DSL, and the structure of the cloud deployment repository 112, and translation rules between a literal associated with a literal type search term associated with the DSL query input and a set of query instructions including search locations for the literal in the cloud deployment repository 112 based on at least one of the literal, the DSL, and the structure of the cloud deployment repository 112.

The functions 132 may include at least a list of functions, where each function of the list of functions may include a function name, such as, for example, an alphanumeric name which may be used for identification of the function, and a function. Each function of the list of functions may provide a set of values as the output of the function, where the set of values of the output of the function may be an empty set of values, as previously described.

The metric evaluations 134 may include at least one of a list of metrics in the cloud deployment repository 112 and a list of where each of the metrics of the list of metrics is in the metrics data 144 in the cloud deployment repository 112 for at least one of the customers, the tenants, the applications, the processes, or the cloud systems.

During operation at configuration time, maintenance time, or update time, the DSL engine 110 may configure translation rules metadata 130 with the at least one of translation rules between a metric-based DSL element and a set of query instructions including the search locations for metrics data 144 for each cloud system 106 of the plurality of cloud systems 106, translation rules between a functional DSL element and a set of query instructions including the search locations for the metrics data 144 for each cloud system 106 of the plurality of cloud systems 106, and translation rules between a literal and a set of query instructions including the search locations for literals in the cloud deployment repository 112, where the search locations for literals may include at least one of the customer data 136, the tenant data 138, the applications data 140, the processes data 142, or the metrics data 144, configure functions 132 with each function of the list of functions supported by the query system 102, and configure the metric evaluations 134 with the at least one of a list of metrics in the cloud deployment repository 112 and a list of where each of the metrics of the list of metrics is in the metrics data 144 in the cloud deployment repository 112 for the customers, the tenants, the applications, the processes, and the cloud system.

During operation at query time, a user 101 may enter DSL query input including at least one search term in human-readable form in the DSL query interface 150. The client 104 may generate a DSL query request 160 including the DSL query input including the at least one search term. The client 104 may transmit the DSL query request 160 to the DSL engine 110 of the query system 102 utilizing the web interface 116 and the DSL query endpoint at the DSL engine 110. The DSL engine 110 may receive the DSL query request from the client 104 at the DSL query endpoint. The monitor engine 114 may perform the update metrics data process to update the metrics data 144 associated with each cloud system 106 of the plurality of cloud system 106 stored in the cloud deployment repository 112 with the metrics data 148 maintained on each cloud system 106 of the plurality of cloud systems based on the system data 135 in the cloud deployment repository 112, as previously described. The monitor engine 114 may perform the update metrics data process to retrieve the metrics data 148 and update the metrics data 144 periodically based on a programmable time period, such as, for example, every two minutes, a particular interval based on a programmable interval, dynamically on demand, such as, for example, from a call initiated by the DSL engine 110 to update the metrics data 144 in real-time, at another appropriate time, or based on another appropriate mechanism or event, as previously described.

The translation engine 120 may resolve and interpret the DSL query input including the at least one search term in the DSL query request based on the DSL query input, the translation rules metadata, and the DSL. The translation engine 120 may translate the DSL query input including the at least one search term to a set of query instructions based on the DSL query input, the translation rules metadata, and the DSL. When the translation engine 120 determines that the DSL query input includes a set of DSL elements based on the DSL, the translation engine 120 may translate each DSL element of the set of DSL elements to a subset of DSL element query instructions of the set of query instructions based on a DSL element type of each DSL element, the translation rules metadata, and the DSL. When the translation engine 120 determines that the DSL query input includes a set of literals of literal type search terms based on the DSL, the translation engine 120 may translate each literal of the set of literals to a subset of literal query instructions of the set of query instructions based further on each literal.

The execution engine 122 may execute the set of query instructions as a complex query to retrieve, for each cloud system 106 of the plurality of cloud systems 106, metrics data 144 associated with an application state 146 of an application 124 deployed on each cloud system 106 stored in the cloud deployment repository 112 as retrieved metrics data. When the set of query instructions also includes the subset of literal query instructions, the execution engine 122 also retrieves the systems data 135, the customer data 136, the tenant data 138, the applications data 140, and the processes data 142 as retrieved literals data.

The DSL engine 110 may compute a set of response output by matching the retrieved metrics data from the cloud deployment repository 112 to the DSL query input based on the DSL query input and the DSL. If the DSL query input does not match with any of the retrieved metrics data, the set of response output will be an empty set. The matching is performed between each search term of the DSL query input taking into account whether a search term includes an exclusion indicator (e.g. "−") and whether a logical operator is included between search terms (e.g. "and", "or") and the retrieved metrics data across all of the cloud systems.

For example, when the DSL query input includes "cpu: critical and -diskspace:warning and ABC Corporation", the set of response output would include only the cloud systems that have an application state with metrics of "cpu:critical", did not have metrics of "diskspace:warning" (due to the exclusion indicator in front of the "−" "diskspace:warning" DSL query input) and have an associated customer name of "ABC corporation". The "and" operators allowed these search terms to be combined in the DSL query and in the set of response output, and the exclusion indicator allowed applications states for "ABC corporation" including "cpu: critical" and "diskspace:warning" to be filtered from the set of response output.

When the DSL query input includes a set of literals, the DSL engine 110 may also compute a set of literal response output that may be a subset of the set of response output by matching the retrieved literals data and the retrieved metrics data from the cloud deployment repository 112 to the set of literals in the DSL query input based on the set of literals in the DSL query input and the DSL. The set of literal response output may include data that matches any data across the current cloud deployment. This may include a new metric that was added to one or more of the cloud systems 106 and its current value even though the metric itself has yet to be added to the metric evaluations 134. In this way, a new metric may be added to an application 124 deployed on one or more cloud systems 106 without the need to make any modifications to the DSL query system 102, the new metric is simply supported by the DSL query system 102.

The DSL engine 110 may generate a DSL query response 162 including the set of response output. The DSL engine 110 may transmit the DSL query response 162 to the client 104. The client 104 may receive the DSL query response 162 including the set of response output. The client 104 may display the set of response output to the user 101 on the display output 152 of the client 104. In the example, the display output 152 may include "cloud system 1 Any name application cpu:critical ABC Corporation" "cloud system 3 Any name application cpu:critical ABC Corporation".

The query system 102 also provides auto-completion functionality to the user 101 using the DSL query interface 150 of the web interface 116. The auto-completion functionality provides suggestion to a user 101 about what metrics currently exist in the cloud deployment repository 112 for the active cloud systems 106 of the plurality of cloud systems 106 in the cloud deployment, what a user 101 may search, such as, metrics, functions, customers, tenants, and other data, and what results are currently in the cloud deployment repository 11. The auto-completion functionality provides a way for a user 101 to navigate the query system 102.

In an example, the user 101 may enter a literal, such as, for example, a partial customer name of a customer in the DSL query interface 150 indicating that auto-completion is to be performed. The client 104 may generate a DSL query request 160 including the partial customer name and an auto-completion indicator indicating that auto-completion results are to be returned for the partial customer name. The client 104 may transmit the DSL query request 160 to the DSL engine 110 of the query system 102 utilizing the DSL query endpoint of the web interface 116.

The DSL engine 110 may receive the DSL query request including the partial customer name and the auto-completion indicator indicating that auto-completion results are to be returned for the partial customer name from the client 104 at the DSL query endpoint. The execution engine 122 may execute a set of customer query instructions as a complex query to retrieve customer data 136 stored in the cloud deployment repository 112 as retrieved customer data.

The DSL engine 110 may compute a set of customer names by matching the partial customer name to a portion of a customer name of a customer of a list of customers in the retrieved customer data. The DSL engine 110 may generate a DSL query response 162 including the set of customer names. The DSL engine 110 may transmit the DSL query response 162 including the set of customer names to the client 104. The client 104 may receive the DSL query response 162 including the set of customer names. When the set of customer names is non-empty, the client 104 may display the set of customer names to the user 101 on the DSL query interface 150 of the web interface 116. The user 101 may select a customer name of the set of customer names as part of the DSL query input of a query that the user 101 is building. When the set of customer names is empty indicating that no customer name matching the partial customer name exists in the cloud deployment. For example, "AB" may be entered in the DSL query interface 150 and the suggested response may be returned and displayed in the DSL query interface as "ABC Corporation" "AB Industries", which may be two customer names for two customers in the cloud deployment repository 112 found in a search across all the customers associated with all the cloud systems 106 in the cloud deployment.

The use case for this is to find particular customers and respond with a list of the customers by customer name. Once the list of customers is returned, a possible next DSL query may be to search for metrics in a particular state (e.g. "critical") that may be associated with one of the customers (e.g. "AB Industries" on each of the cloud systems. The response to this DSL query would include any cloud systems having metrics in a "critical" state for the customer "AB Industries", such as, for example, "cloud system 1 Any name application cpu:critical diskspace:critical AB Industries" "cloud system 3 Any name application cpu:critical AB Industries".

In another example, the user 101 may enter a literal, such as, for example, a metric name of a metric in the DSL query interface 150 indicating that auto-completion is to be performed. The client 104 may generate a DSL query request 160 including the metric name and an auto-completion indicator indicating that auto-completion results are to be returned for the metric name. The client 104 may transmit the DSL query request 160 to the DSL engine 110 of the query system 102 utilizing the DSL query endpoint of the web interface 116.

The DSL engine 110 may receive the DSL query request including the metric name and the auto-completion indicator indicating that auto-completion results are to be returned for the metric name from the client 104 at the DSL query endpoint. The DSL engine 110 may determine whether the metric name matches a particular metric name in a particular metric evaluation of the set of metric evaluations 134. When the DSL engine 110 determines that the metric name matches the particular metric name in the particular metric evaluation of the set of metric evaluations 134: the evaluation engine 122 may execute the set of metric query instructions of the particular metric evaluation as a complex query to retrieve metric evaluation data stored in the cloud deployment repository 112 as retrieved metric evaluation data, the DSL engine 110 may compute a set of metric-based DSL elements by matching the particular metric name and each possible metric value of the set of possible metric values to the retrieved metric evaluation data, the DSL engine 110 may generate a DSL query response 162 including the set of metric-based DSL elements, and the DSL engine 110 may transmit the DSL query response 162 including the set of metric-based DSL elements to the client 104.

The client 104 may receive the DSL query response 162 including the set of metric-based DSL elements. The client 104 may display the set of metric-based DSL elements to the user 101 on the DSL query interface 150 of the web interface 116. The user 101 may select one or more of the set of metric-based DSL elements as part of the DSL query input of a query that the user 101 is building. For example, "cpu" may be entered in the DSL query interface 150 and the suggested response may be returned and displayed in the DSL query interface as "cpu:critical cpu:warning cpu load: critical cpu usage:warning", which auto-completes as "cpu", "cpu load" and "cpu usage" and also shows that cpu has two states "critical" and "warning", cpu load has one state of "critical", and cpu usage has one state of "warning", which indicates that applications in the cloud systems currently have these states in one or more applications deployed on one or more cloud systems. The auto-completion functionality is based on current status and returns matching metrics and their current states. If no application deployed on any cloud system had a cpu and cpu load having a "critical" current state, then only "cpu:warning cpu usage:warning" would be displayed and "cpu:critical cpu load:critical" would not be displayed.

In yet another example, the user 101 may enter a literal, such as, for example, a function name of a function in the DSL query interface 150 indicating that auto-completion is to be performed. The client 104 may generate a DSL query request 160 including the function name and an auto-completion indicator indicating that auto-completion results are to be returned for the function name. The client 104 may transmit the DSL query request 160 to the DSL engine 110 of the query system 102 utilizing the DSL query endpoint of the web interface 116.

The DSL engine 110 may receive the DSL query request including the function name and the auto-completion indicator indicating that auto-completion results are to be returned for the function name from the client 104 at the DSL query endpoint. The DSL engine 110 may determine whether the function name matches a particular function name in a particular function of a set of functions 132. When the DSL engine 110 determines that the function name matches a particular function name in a particular function of a set of functions 132: the evaluation engine 122 may execute the set of function query instructions of the particular function of the set of functions 132 as a complex query to retrieve function evaluation data stored in the cloud deployment repository 112 as retrieved function evaluation data, the DSL engine 110 may compute a set of functional DSL elements by matching the particular function name and each possible function output value of the set of possible function output values to the retrieved function evaluation data, the DSL engine 110 may generate a DSL query response 162 including the set of functional DSL elements, and the DSL engine 110 may transmit the DSL query response 162 including the set of functional DSL elements to the client 104.

The client 104 may receive the DSL query response 162 including the set of functional DSL elements. The client 104 may display the set of functional DSL elements to the user 101 on the DSL query interface 150 of the web interface 116. The user 101 may select one or more of the set of functional DSL elements as part of the DSL query input of a query that the user 101 is building. For example, "alerts" may be entered in the DSL query interface 150 and the suggested response may be returned and displayed in the DSL query interface as "alerts:critical alerts:warning", which auto-completes as "alerts:critical" and "alerts:warning" and also shows that alerts has two outputs "critical" and "warning", which indicates that applications in the cloud systems currently have these "critical" and "warning" alerts in one or more applications deployed on one or more cloud systems. The auto-completion functionality is based on matching functions and each function is evaluated against the current state of the applications deployed on each of the cloud systems in the cloud deployment. In the DSL query system 102, functions are evaluated every time they are queried.

The DSL query system 102 may provide two methods to validate the DSL query input in a simple way. In the first method, the DSL query system 102 may provide a list of all of the currently valid DSL elements to the user 101 on the client 104, which is an explicit way to validate the DSL query input. In the second method, which is implicit, the DSL query system 102 provides the auto-completion functionality, previously described. A user 101 may enter a non-existent search term or may have a syntax error, which may result in the auto-completion functionality return and empty set of results output because nothing matches the non-existent search term or nothing matches with a search term having a syntax error. The lack of results output when auto-completion functionality is enabled indicates to the user that they DSL query input may be incorrect, which is the result in a very high percentage of cases. In a very low percentage of cases, the lack of results output may be due to nothing matching in the cloud deployment and the DSL query input may be valid.

The DSL query system 102 also provides various forms of navigation in the user interface (UI). The DSL query response 162 provided to the web interface 116 of the client 104 may further include a link to each application associated with each correspond metric, and the numerical value and the numerical range of possible numeric values of each metric to each corresponding metric-based DSL element included in the DSL query response 162. When the client 104 receives the DSL query response 162 and the set of output results associated with each metric-based DSL element is displayed to the user 101 in display output 152, the user 101 may select and click on a particular metric-based DSL element, the numeric value and the numerical range of possible numeric values of the metric may also be displayed. For example, a cpu:critical metric-based DSL element may be selected and the numeric value of 99% may be displayed and the numerical range of 80% to 100% may be displayed showing that the cpu:critical metric is very high at 99% and is clearly in the critical range of the metric.

A link to the account application may also be displayed to the user 101. If the user 101 is an administrator and has the appropriate security credentials, the user 101 may select and click on the link to the account application so that the user 101 may inspect the application a perform a deep dive analysis of the application to determine what is going on and resolve the critical state of the cpu. The user 101 may be able to inspect the locks involved, and other appropriate aspects of the application to determine root-cause of why the cpu is in a critical state. By providing this capability, the user 101 may identify any critical situations and interests in the cloud deployment and be able to perform an efficient and straightforward error analysis and resolution process.

In one or more embodiments, the context of the user 101 may also be consider in utilizing the DSL query system 102 and the navigation capabilities of the user interface. For example, context data associated with a particular user 101 may include authorization data, security data, location data, and other types of context data. The access and display of different data in the cloud deployment repository 112 and access to various applications 124 deployed on one or more cloud systems 106 in the plurality of cloud systems in the cloud deployment may be limited based on the context data associated with the particular user 101. For example, if the user 101 is an administrator for a subset of the applications 124 deployed on a subset of cloud systems 106, the user may only be able to utilize the DSL query system 102 and the navigation links to account applications on these subsets of the applications 124 and cloud systems 106, and would not be provided any access to the data, applications, or cloud systems that are not part of these subsets. The access may also be limited based on a geographic location of the particular user 101. For example, a user 101 that is geographically located in the USA may be limited to cloud systems 106 and associated applications 124 and data physically located in the USA and would not be permitted any type of access to cloud systems 102 located in Europe, Asia, or another geographic location other than the USA.

FIG. 2 is a flowchart illustrating an example of a computer-implemented method 200 for providing a domain specific language for a cloud hosted system with metric-based state, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a first DSL query request including first DSL query input based on a DSL is received or identified, by a domain specific language (DSL) query system, from a client system. In one or more embodiments, a first DSL query request including the first DSL query input based on the DSL is identified, by the DSL query system, from the client system. From 202, method 200 proceeds to 204.

At 204, the first DSL query input is translated, by the DSL query system, to a first set of query instructions based on the first DSL query input, translation rules metadata, and the DSL. In some implementations, translation of the first DSL query input further comprises: when the DSL query system determines that the first DSL query input includes a set of DSL elements based on the DSL: each DSL element of the set of DSL elements is translated to a subset of DSL element query instructions of the set of query instructions based further on a DSL element type of each DSL element, where the DSL element type comprises a metric-based DSL element type or a functional DSL element type; and when the DSL query system determines that the first DSL query input includes a set of literals of literal type search terms based on the DSL: each literal of the set of literals is translated to a subset of literal query instructions of the set of query instructions based further on each literal. In some implementations, the translation rules metadata includes at least one of: translation rules between a metric-based DSL element type DSL element associated with the DSL query input and a set of query instructions including search locations for metrics data for each cloud system of the plurality of cloud systems stored in the cloud deployment repository; translation rules between a functional DSL element type DSL element associated with DSL query input and a set of query instructions including search locations for the metrics data for each cloud system of the plurality of cloud systems stored in the cloud deployment repository; and translation rules between a literal associated with a literal type search term associated with the DSL query input and a set of query instructions including search locations for the literal in the cloud deployment repository. From 204, the method 200 proceeds to 206.

At 206, the first set of query instructions is executed as a complex query, by the DSL query system, to retrieve, for each cloud system of a plurality of cloud systems in a cloud deployment, metrics data associated with an application state of an application deployed on each cloud system stored in a cloud deployment repository as retrieved metrics data. In some implementations, an update metrics data process is executed. The update metrics data process can, in some instances, comprise: for each cloud system of the plurality of cloud systems, cloud system metrics data associated with the application state of the application deployed on each cloud system is retrieved from each cloud system of the plurality of cloud systems as retrieved cloud systems metrics data; and for each cloud system of the plurality of cloud systems, the metrics data stored in the cloud deployment repository is updated with the retrieved cloud systems metrics data, and the update metrics data process is executed periodically based on a programmable time period, a particular interval based on a programmable interval, or dynamically on demand. In some implementations, a second DSL query request including second DSL query input based on the DSL is received, by the DSL query system, from the client system and an auto-completion indicator indicating that auto-completion results are to be returned for the second DSL query input; and when the DSL query system determines that a portion of the second DSL query input matches a particular metric name in a particular metric evaluation of a set of metric evaluations, where each metric evaluation of the set of metric evaluations includes a metric name of an associated metric, a set of possible metric values of the associated metric, and a set of metric query instructions including search locations for metrics data of the associated metric for each cloud system of the plurality of cloud systems stored in the cloud deployment repository: the set of metric query instructions of the particular metric evaluation is executed, by the DSL query system, to retrieve metric evaluation data stored in the cloud deployment repository as retrieved metric evaluation data; a set of metric-based DSL elements in an auto-completion DSL query response is computed by matching the particular metric name and each possible metric value of the set of possible metric values to the retrieved metric evaluation data; and the auto-completion DSL query response is transmitted to the client system. From 206, the method 200 proceeds to 208.

At 208, a first set of response output is computed, by the DSL query system, by matching the retrieved metrics data from the cloud deployment repository to the first DSL query input based on the first DSL query input and the DSL. In some implementations, a second DSL query request including second DSL query input based on the DSL is received, by the DSL query system, from the client system and an auto-completion indicator indicating that auto-completion results are to be returned for the second DSL query input; and when the DSL query system determines that a portion of the second DSL query input matches a particular function name in a particular function of a set of functions, where each function of the set of functions includes a function name, a set of possible function output values, and a set of function query instructions including search locations for metrics data associated with each function for each cloud system of the plurality of cloud systems stored in the cloud deployment repository: the set of function query instructions of the particular function is executed, by the DSL query system, to retrieve function evaluation data stored in the cloud deployment repository as retrieved function evaluation data; a set of functional DSL elements in the auto-completion DSL query response is computed by matching the particular function name and each possible function output value of the set of possible function output values to the retrieved function evaluation data; and the auto-completion DSL query response is transmitted to the client system. From 208, the method 200 proceeds to 210.

At 210, a first DSL query response including the first set of response output is transmitted, by the DSL query system, to the client system. In some implementations, a second DSL query request including second DSL query input based on the DSL is received, by the DSL query system, from the client system and an auto-completion indicator indicating that auto-completion results are to be returned for the second DSL query input; a set of customer query instructions is executed, by the DSL query system, to retrieve customer data stored in the cloud deployment repository as retrieved customer data, the customer data includes a set of customers, each customer of the set of customers includes a customer name; a set of customer names in the auto-completion DSL query response is computed by matching the second DSL query input to a portion of a customer name of each customer of the set of customers in the retrieved customer data; and the auto-completion DSL query response is transmitted to the client system. After 210, method 200 stops.

Figure 3:
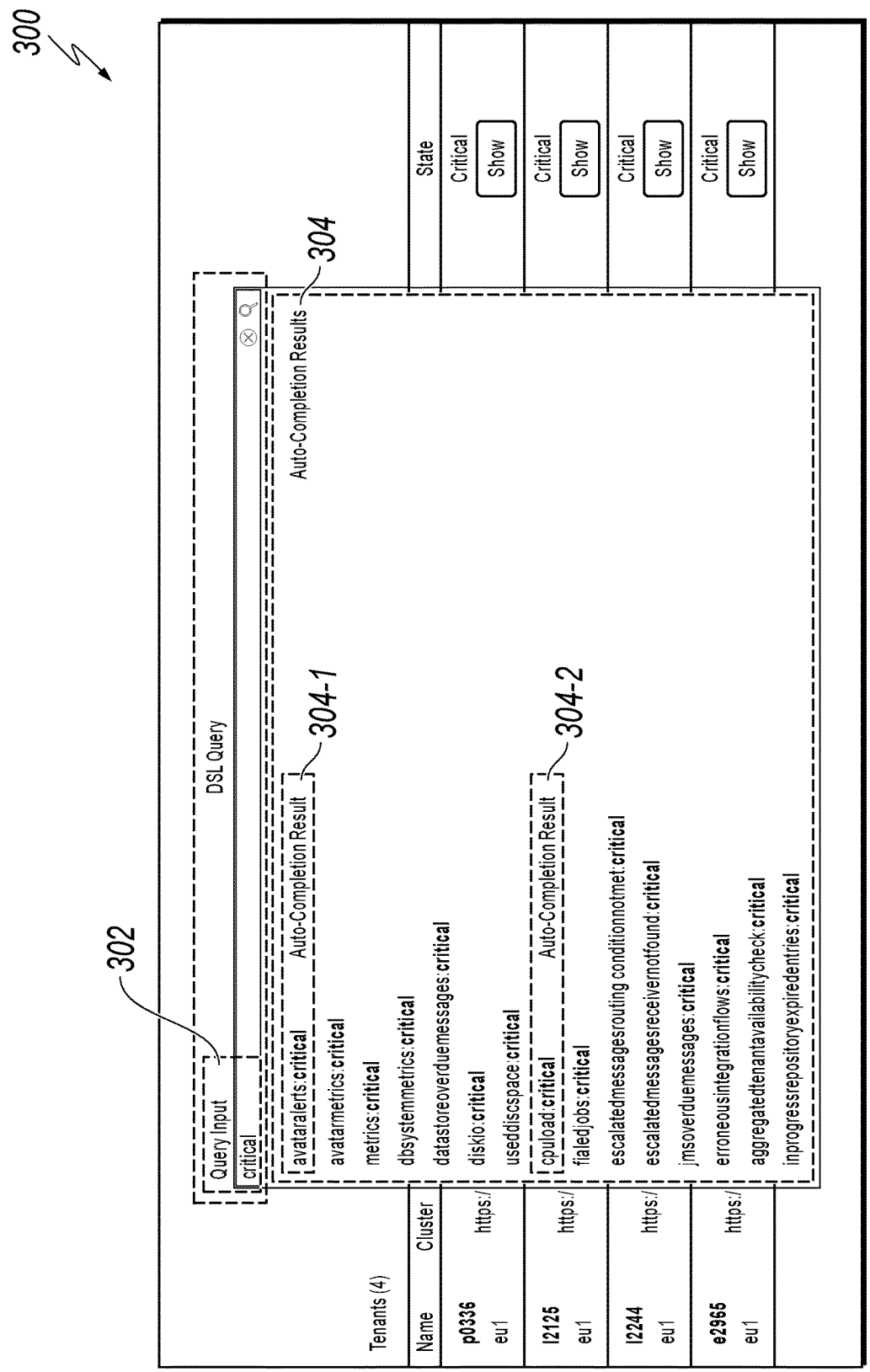
FIG. 3 is a depiction illustrating an example of user interface display content including a response from a query system in response to a query including a literal with auto-completion, according to an implementation of the present disclosure.

FIG. 3 is a depiction illustrating an example of user interface display content 300 including a response from a query system, such as, query system 102 previously described with reference to FIG. 1. As shown, the user interface display content 300 includes query input 302 including a literal of "critical" entered at a DSL query interface 350. The DSL query interface 350 may comprise DSL query 150 previously described with reference to FIG. 1. Also shown, the user interface display content 300 includes auto-completion results 304 returned from the query system 102 after the query system 102 evaluated the query input 302 of "critical" entered at the DSL query interface 350 with auto-completion enabled. The auto-completion results 304 shown includes a plurality of metric-based DSL elements associated with at least one application deployed on at least one cloud system of a plurality of cloud systems that have a metric having a value of "critical" and at least one functional based DSL element having a function having at least one function output value of "critical" after evaluation of the function. For example, an auto-completion result 304-1 of the auto-completion results 304 includes a functional based DSL element having a function with a function name of "avataralerts and a function output value of "critical". An auto-completion result 304-2 of the auto-completion results 304 includes a metric-based DSL element having a metric with a metric name of "cpuload" and a value of "critical".

Figure 4:
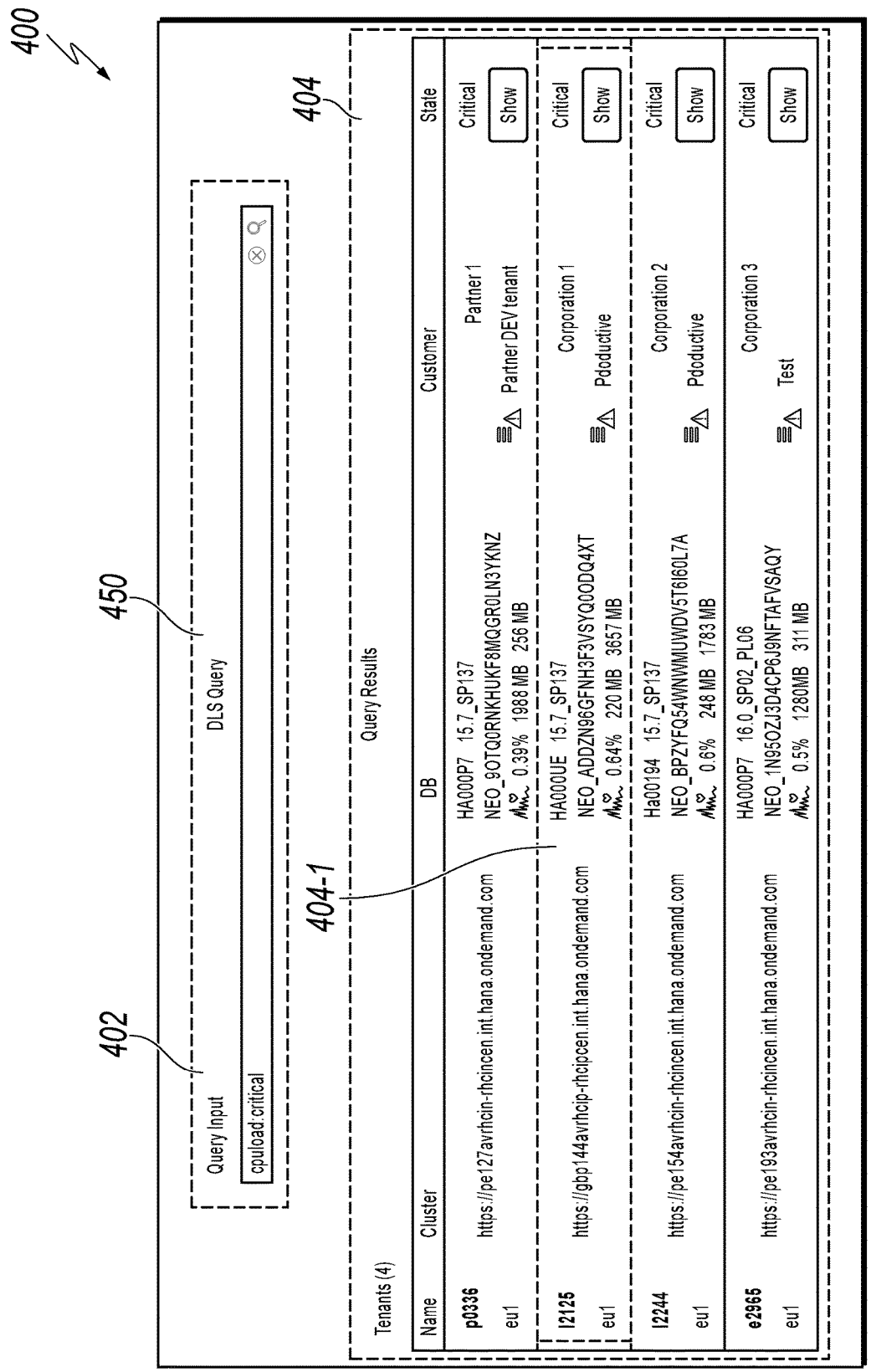
FIG. 4 is a display image illustrating an example of user interface display content including a response from a query system in response to a query including a metric-based DSL element, according to an implementation of the present disclosure.

FIG. 4 is a display image illustrating an example of user interface display content 400 including a response from a query system, such as, the query system 102 previously described with reference to FIG. 1, in response to a query including a metric-based DSL element. As shown, the user interface display content 400 includes query input 402 including the metric based DSL element having a metric name of "cpuload" and a metric value of "critical" entered at a DSL query interface 450. The metric-based DSL element "cpuload:critical" may have been directly entered by a user. The metric-based DSL element "cpuload:critical" may also have been selected by a user from auto-completion results including an auto-completion result of "cpuload: critical" previously returned based on previously entered query input. For example, a user may have selected auto-completion result 304-2 of auto-completion results 304 including "cpuload:critical" previously returned based on "cpuload" being entered as query input 302, previously described with reference to FIG. 3. The DSL query interface 450 may comprise DSL query 150 previously described with reference to FIG. 1. Also shown, the user interface display content 400 includes query results 404 returned from the query system 102 after the query system 102 evaluated the query input 402 of "cpuload:critical" entered at the DSL query interface 450. The query results 404 shown include at least one application deployed on four cloud systems of a plurality of cloud systems for four tenants, "Tenants (4)" that have a matching metric with the metric name of "cpuload" and the value of "critical". A query result 404-1 of the query results 404 include the cloud system having the cloud system name of "12125eu1", a tenant of the four tenants with the customer name of "Corporation 1", and the at least one application having the matching metric with the value "Critical". The query result 404-1 also includes a button with a button name of "Show" underneath the "Critical" metric value. When a user selects and/or clicks on the "Show" button, further details of the application state of the application deployed on the cloud system "12125eu1" would be shown, such as, for example, a numeric value of the metric "cpuload".

Figure 5:
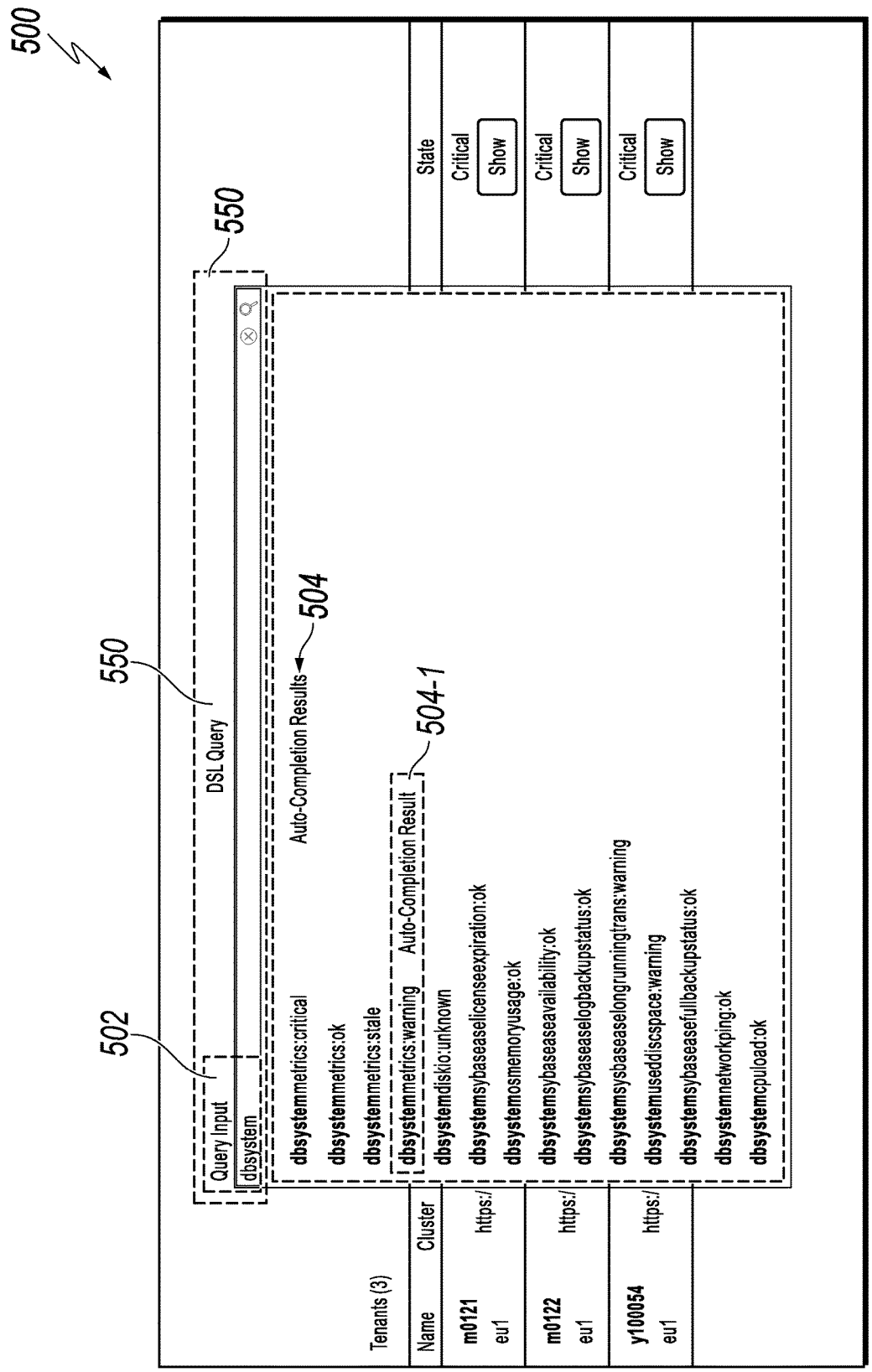
FIG. 5 is a display image illustrating an example of user interface display content including a response from a query system in response to a query including a literal with auto-completion, according to an implementation of the present disclosure.

FIG. 5 is a display image illustrating an example of user interface display content 500 including a response from a query system, such as, for example, the query system 102 previously described with reference to FIG. 1, in response to a query including a literal with auto-completion. As shown, the user interface display content 500 includes query input 502 including a literal of "dbsystem" entered at a DSL query interface 550. The DSL query interface 550 may comprise DSL query 150 previously described with reference to FIG. 1. Also shown, the user interface display content 500 includes auto-completion results 504 returned from the query system 102 after the query system 102 evaluated the query input 502 of "dbsystem" entered at the DSL query interface 550 with auto-completion enabled. The auto-completion results 504 shown for at least one application deployed on at least one cloud system of a plurality of cloud systems include metric based DSL elements and other application state data where at least a portion of a metric name of a metric-based DSL element or a portion of other application state data matched with "dbsystem" of query input 502. For example, an auto-completion result 504-1 of the auto-completion results 504 includes a metric-based DSL element having a metric with a metric name of "dbsystemmetrics" and a value of "warning".

Figure 6:
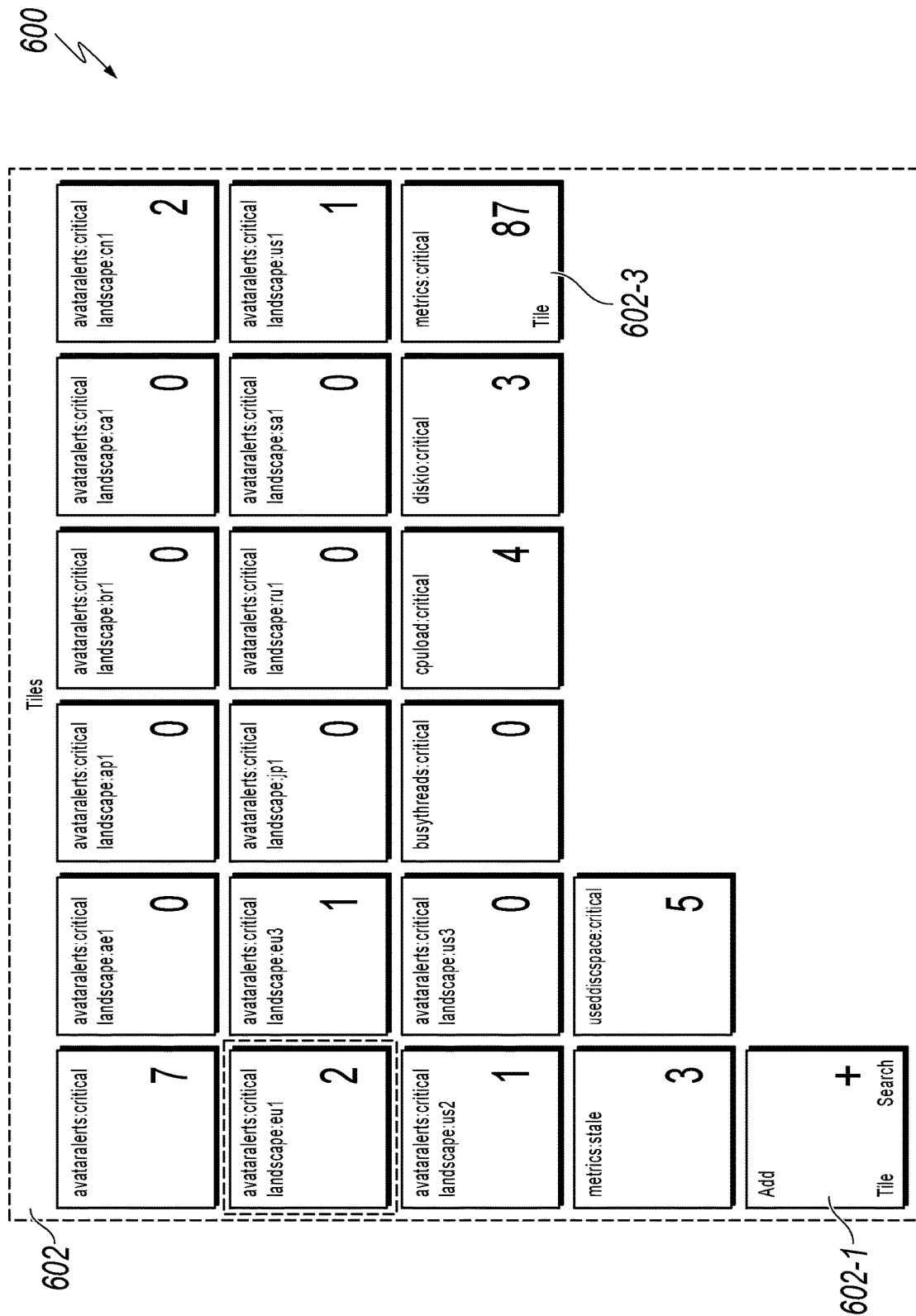
FIG. 6 is a display image illustrating an example of user interface display content including a plurality of tiles with dynamic query system data from a query system, according to an implementation of the present disclosure.

FIG. 6 is a display image illustrating an example of user interface display content 600 including a plurality of tiles 602 with dynamic query system data from a query system, for example, the query system 102 previously described with reference to FIG. 1. As shown, the user interface display content 600 includes the plurality of tiles 602 including tiles 602-1, 602-2, and 602-3. The user interface may comprise web interface 116 previously described with reference to FIG. 1.

The web interface 116 may provide a user with the ability to create a dashboard including the tiles 602, which may allow different tiles 602 of the tiles 602 to display dynamic query system data provided to the web interface 116 from the query system 102 of application state of a one or more application deployed on one or more cloud systems of a plurality of cloud systems in a cloud deployment. For example, the tile 602-1 may provide a user with the ability to add tiles to a dashboard using add tile functionality by selecting or clicking the "+" button shown in the tile 602-1. Once the add tile functionality of the web interface 116 is selected, the user may add one or more DSL elements to the new tile 602 being defined. Once the user has added all of the one or more DSL elements and completed the definition of the new tile 602, the web interface 116 may add the new tile 602 to the dashboard.

The user may use the dashboard to monitor the state of the cloud deployment and respond to any issues that present themselves in real-time. The web interface 116 may update each tile 602 of the dashboard with the dynamic query system data based on the current application state of the associated data whenever the web interface 116 requests the query system data from the query system 102. The web interface 116 may request the query the system data periodically based on a programmable time period, a particular interval based on a programmable interval, dynamically on demand, or on another periodic basis. For example, the tile 602-2 of the tiles 602 may include the number of alerts, "2", for the "avataralerts" function that has at least one function output with the value of "critical" and the associated cloud system of the plurality of cloud systems also has a matching "landscape" with a value of "eu1", where the number of alerts "2" for the "avataralerts" function have the "critical" function output value and the associated cloud system has the "landscape" with the value of "eu1" when the web interface 116 last requested the dynamic query system data for all the tiles 602. As another example, the tile 602-3 of tiles 602 of the user interface display content 600 may include the number of metrics, "87", in the cloud deployment that have a metric value of "critical" based on "metrics: critical" defined in the tile 602-3, where the number of metrics "87" have the "critical" metric value when the web interface 116 last requested the dynamic query system data for all the tiles 602.

Figure 7:
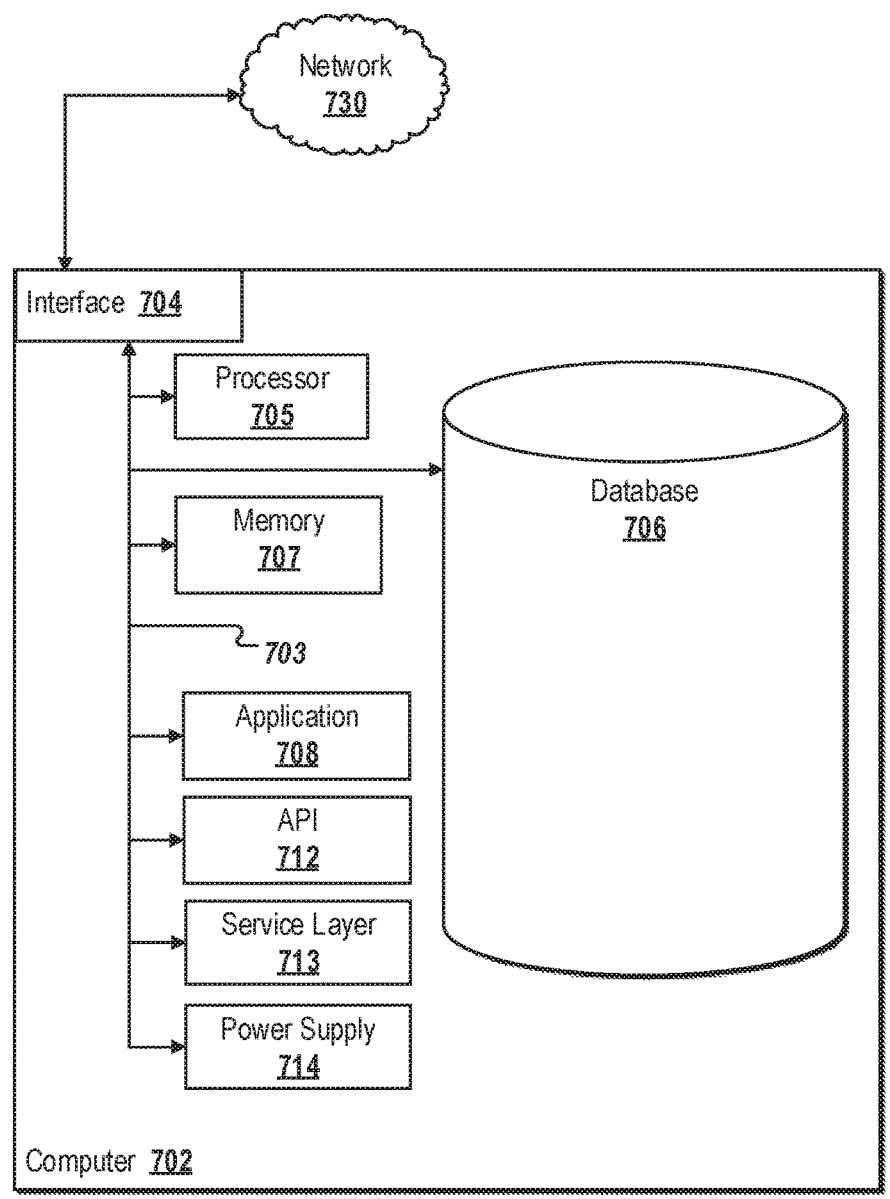
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented System 700 used to provide computational functionalities associated with described algorithms, methods, functions, processes, flows, and procedures, according to an implementation of the present disclosure. In the illustrated implementation, System 700 includes a Computer 702 and a Network 730.

The illustrated Computer 702 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 702 can include an input device, such as a keypad, keyboard, or touch screen, or a combination of input devices that can accept user information, and an output device that conveys information associated with the operation of the Computer 702, including digital data, visual, audio, another type of information, or a combination of types of information, on a graphical-type user interface (UI) (or GUI) or other UI.

The Computer 702 can serve in a role in a distributed computing system as, for example, a client, network component, a server, or a database or another persistency, or a combination of roles for performing the subject matter described in the present disclosure. The illustrated Computer 702 is communicably coupled with a Network 730. In some implementations, one or more components of the Computer 702 can be configured to operate within an environment, or a combination of environments, including cloud-computing, local, or global.

At a high level, the Computer 702 is an electronic computing device operable to receive, transmit, process, store, or manage data and information associated with the described subject matter. According to some implementations, the Computer 702 can also include or be communicably coupled with a server, such as an application server, e-mail server, web server, caching server, or streaming data server, or a combination of servers.

The Computer 702 can receive requests over Network 730 (for example, from a client software application executing on another Computer 702) and respond to the received requests by processing the received requests using a software application or a combination of software applications. In addition, requests can also be sent to the Computer 702 from internal users (for example, from a command console or by another internal access method), external or third-parties, or other entities, individuals, systems, or computers.

Each of the components of the Computer 702 can communicate using a System Bus 703. In some implementations, any or all of the components of the Computer 702, including hardware, software, or a combination of hardware and software, can interface over the System Bus 703 using an application programming interface (API) 712, a Service Layer 713, or a combination of the API 712 and Service Layer 713. The API 712 can include specifications for routines, data structures, and object classes. The API 712 can be either computer-language independent or dependent and refer to a complete interface, a single function, or even a set of APIs. The Service Layer 713 provides software services to the Computer 702 or other components (whether illustrated or not) that are communicably coupled to the Computer 702. The functionality of the Computer 702 can be accessible for all service consumers using the Service Layer 713. Software services, such as those provided by the Service Layer 713, provide reusable, defined functionalities through a defined interface. For example, the interface can be software written in a computing language (for example JAVA, JavaScript, or C++) or a combination of computing languages, and providing data in a particular format (for example, extensible markup language (XML)) or a combination of formats. While illustrated as an integrated component of the Computer 702, alternative implementations can illustrate the API 712 or the Service Layer 713 as stand-alone components in relation to other components of the Computer 702 or other components (whether illustrated or not) that are communicably coupled to the Computer 702.

Moreover, any or all parts of the API 712 or the Service Layer 713 can be implemented as a child or a sub-module of another software module, enterprise application, or hardware module without departing from the scope of the present disclosure.

The Computer 702 includes an Interface 704. Although illustrated as a single Interface 704, two or more Interfaces 704 can be used according to particular needs, desires, or particular implementations of the Computer 702. The Interface 704 is used by the Computer 702 for communicating with another computing system (whether illustrated or not) that is communicatively linked to the Network 730 in a distributed environment. Generally, the Interface 704 is operable to communicate with the Network 730 and includes logic encoded in software, hardware, or a combination of software and hardware. More specifically, the Interface 704 can include software supporting one or more communication protocols associated with communications such that the Network 730 or hardware of Interface 704 is operable to communicate physical signals within and outside of the illustrated Computer 702.

The Computer 702 includes a Processor 705. Although illustrated as a single Processor 705, two or more Processors 705 can be used according to particular needs, desires, or particular implementations of the Computer 702. Generally, the Processor 705 executes instructions and manipulates data to perform the operations of the Computer 702 and any algorithms, methods, functions, processes, flows, and procedures as described in the present disclosure.

The Computer 702 also includes a Database 706 that can hold data for the Computer 702, another component communicatively linked to the Network 730 (whether illustrated or not), or a combination of the Computer 702 and another component. For example, Database 706 can be an in-memory or conventional database storing data consistent with the present disclosure. In some implementations, Database 706 can be a combination of two or more different database types (for example, a hybrid in-memory and conventional database) according to particular needs, desires, or particular implementations of the Computer 702 and the described functionality. Although illustrated as a single Database 706, two or more databases of similar or differing types can be used according to particular needs, desires, or particular implementations of the Computer 702 and the described functionality. While Database 706 is illustrated as an integral component of the Computer 702, in alternative implementations, Database 706 can be external to the Computer 702.

The Computer 702 also includes a Memory 707 that can hold data for the Computer 702, another component or components communicatively linked to the Network 730 (whether illustrated or not), or a combination of the Computer 702 and another component. Memory 707 can store any data consistent with the present disclosure. In some implementations, Memory 707 can be a combination of two or more different types of memory (for example, a combination of semiconductor and magnetic storage) according to particular needs, desires, or particular implementations of the Computer 702 and the described functionality. Although illustrated as a single Memory 707, two or more Memories 707 or similar or differing types can be used according to particular needs, desires, or particular implementations of the Computer 702 and the described functionality. While Memory 707 is illustrated as an integral component of the Computer 702, in alternative implementations, Memory 707 can be external to the Computer 702.

The Application 708 is an algorithmic software engine providing functionality according to particular needs, desires, or particular implementations of the Computer 702, particularly with respect to functionality described in the present disclosure. For example, Application 708 can serve as one or more components, modules, or applications. Further, although illustrated as a single Application 708, the Application 708 can be implemented as multiple Applications 708 on the Computer 702. In addition, although illustrated as integral to the Computer 702, in alternative implementations, the Application 708 can be external to the Computer 702.

The Computer 702 can also include a Power Supply 714. The Power Supply 714 can include a rechargeable or non-rechargeable battery that can be configured to be either user- or non-user-replaceable. In some implementations, the Power Supply 714 can include power-conversion or management circuits (including recharging, standby, or another power management functionality). In some implementations, the Power Supply 714 can include a power plug to allow the Computer 702 to be plugged into a wall socket or another power source to, for example, power the Computer 702 or recharge a rechargeable battery.

There can be any number of Computers 702 associated with, or external to, a computer system containing Computer 702, each Computer 702 communicating over Network 730. Further, the term "client," "user," or other appropriate terminology can be used interchangeably, as appropriate, without departing from the scope of the present disclosure. Moreover, the present disclosure contemplates that many users can use one Computer 702, or that one user can use multiple computers 702.

Described implementations of the subject matter can include one or more features, alone or in combination.

For example, in a first implementation, a computer-implemented method, comprising: receiving, by a domain specific language (DSL) query system, a first DSL query request including first DSL query input based on a DSL from a client system; translating, by the DSL query system, the first DSL query input to a first set of query instructions based on the first DSL query input, translation rules metadata, and the DSL; executing, by the DSL query system, the first set of query instructions as a complex query to retrieve, for each cloud system of a plurality of cloud systems in a cloud deployment, metrics data associated with an application state of an application deployed on each cloud system stored in a cloud deployment repository as retrieved metrics data; computing, by the DSL query system, a first set of response output by matching the retrieved metrics data from the cloud deployment repository to the first DSL query input based on the first DSL query input and the DSL; and transmitting, by the DSL query system, a first DSL query response including the first set of response output to the client system.

The foregoing and other described implementations can each, optionally, include one or more of the following features:

A first feature, combinable with any of the following features, further comprising: executing an update metrics data process comprising: retrieving, for each cloud system of the plurality of cloud systems, cloud system metrics data associated with the application state of the application deployed on each cloud system from each cloud system of the plurality of cloud systems as retrieved cloud systems metrics data; and updating, for each cloud system of the plurality of cloud systems, the metrics data stored in the cloud deployment repository with the retrieved cloud systems metrics data, and wherein the update metrics data process is executed periodically based on a programmable time period, a particular interval based on a programmable interval, or dynamically on demand.

A second feature, combinable with any of the previous or following features, wherein translating the first DSL query input further comprises: when the DSL query system determines that the first DSL query input includes a set of DSL elements based on the DSL: translating each DSL element of the set of DSL elements to a subset of DSL element query instructions of the set of query instructions based further on a DSL element type of each DSL element, wherein the DSL element type comprises a metric-based DSL element type or a functional DSL element type; and when the DSL query system determines that the first DSL query input includes a set of literals of literal type search terms based on the DSL: translating each literal of the set of literals to a subset of literal query instructions of the set of query instructions based further on each literal.

A third feature, combinable with any of the previous or following features, wherein the translation rules metadata includes at least one of: translation rules between a metric-based DSL element type DSL element associated with the DSL query input and a set of query instructions including search locations for metrics data for each cloud system of the plurality of cloud systems stored in the cloud deployment repository; translation rules between a functional DSL element type DSL element associated with DSL query input and a set of query instructions including search locations for the metrics data for each cloud system of the plurality of cloud systems stored in the cloud deployment repository; and translation rules between a literal associated with a literal type search term associated with the DSL query input and a set of query instructions including search locations for the literal in the cloud deployment repository.

A fourth feature, combinable with any of the previous or following features, further comprising: receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular metric name in a particular metric evaluation of a set of metric evaluations, wherein each metric evaluation of the set of metric evaluations including a metric name of an associated metric, a set of possible metric values of the associated metric, and a set of metric query instructions including search locations for metrics data of the associated metric for each cloud system of the plurality of cloud systems stored in the cloud deployment repository: executing, by the DSL query system, the set of metric query instructions of the particular metric evaluation to retrieve metric evaluation data stored in the cloud deployment repository as retrieved metric evaluation data; computing a set of metric-based DSL elements by matching the particular metric name and each possible metric value of the set of possible metric values to the retrieved metric evaluation data; and transmitting an auto-completion DSL query response including the set of metric-based DSL elements to the client system.

A fifth feature, combinable with any of the previous or following features, further comprising: receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular function name in a particular function of a set of functions, wherein each function of the set of functions including a function name, a set of possible function output values, and a set of function query instructions including search locations for metrics data associated with each function for each cloud system of the plurality of cloud systems stored in the cloud deployment repository: executing, by the DSL query system, the set of function query instructions of the particular function to retrieve function evaluation data stored in the cloud deployment repository as retrieved function evaluation data; computing a set of functional DSL elements by matching the particular function name and each possible function output value of the set of possible function output values to the retrieved function evaluation data; and transmitting an auto-completion DSL query response including the set of functional DSL elements to the client system.

A sixth feature, combinable with any of the previous or following features, further comprising: receiving, by the DSL query system, a second DSL query request including second DSL query input based on the DSL from the client system and an auto-completion indicator indicating that auto-completion results are to be returned for the second DSL query input; executing, by the DSL query system, a set of customer query instructions to retrieve customer data stored in the cloud deployment repository as retrieved customer data, wherein the customer data including a set of customers, each customer of the set of customers including a customer name; computing a set of customer names by matching the second DSL query input to a portion of a customer name of each customer of the set of customers in the retrieved customer data; and transmitting an auto-completion DSL query response including the set of customer names to the client system.

In a second implementation, a non-transitory, computer-readable medium storing one or more instructions executable by a computer system to perform operations comprising: receiving, by a domain specific language (DSL) query system, a first DSL query request including first DSL query input based on a DSL from a client system; translating, by the DSL query system, the first DSL query input to a first set of query instructions based on the first DSL query input, translation rules metadata, and the DSL; executing, by the DSL query system, the first set of query instructions as a complex query to retrieve, for each cloud system of a plurality of cloud systems in a cloud deployment, metrics data associated with an application state of an application deployed on each cloud system stored in a cloud deployment repository as retrieved metrics data; computing, by the DSL query system, a first set of response output by matching the retrieved metrics data from the cloud deployment repository to the first DSL query input based on the first DSL query input and the DSL; and transmitting, by the DSL query system, a first DSL query response including the first set of response output to the client system.

The foregoing and other described implementations can each, optionally, include one or more of the following features:

A first feature, combinable with any of the following features, further comprising: executing an update metrics data process comprising: retrieving, for each cloud system of the plurality of cloud systems, cloud system metrics data associated with the application state of the application deployed on each cloud system from each cloud system of the plurality of cloud systems as retrieved cloud systems metrics data; and updating, for each cloud system of the plurality of cloud systems, the metrics data stored in the cloud deployment repository with the retrieved cloud systems metrics data, and wherein the update metrics data process is executed periodically based on a programmable time period, a particular interval based on a programmable interval, or dynamically on demand.

A second feature, combinable with any of the previous or following features, wherein translating the first DSL query input further comprises: when the DSL query system determines that the first DSL query input includes a set of DSL elements based on the DSL: translating each DSL element of the set of DSL elements to a subset of DSL element query instructions of the set of query instructions based further on a DSL element type of each DSL element, wherein the DSL element type comprises a metric-based DSL element type or a functional DSL element type; and when the DSL query system determines that the first DSL query input includes a set of literals of literal type search terms based on the DSL: translating each literal of the set of literals to a subset of literal query instructions of the set of query instructions based further on each literal.

A third feature, combinable with any of the previous or following features, wherein the translation rules metadata includes at least one of: translation rules between a metric-based DSL element type DSL element associated with the DSL query input and a set of query instructions including search locations for metrics data for each cloud system of the plurality of cloud systems stored in the cloud deployment repository; translation rules between a functional DSL element type DSL element associated with DSL query input and a set of query instructions including search locations for the metrics data for each cloud system of the plurality of cloud systems stored in the cloud deployment repository; and translation rules between a literal associated with a literal type search term associated with the DSL query input and a set of query instructions including search locations for the literal in the cloud deployment repository.

A fourth feature, combinable with any of the previous or following features, further comprising: receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular metric name in a particular metric evaluation of a set of metric evaluations, wherein each metric evaluation of the set of metric evaluations including a metric name of an associated metric, a set of possible metric values of the associated metric, and a set of metric query instructions including search locations for metrics data of the associated metric for each cloud system of the plurality of cloud systems stored in the cloud deployment repository: executing, by the DSL query system, the set of metric query instructions of the particular metric evaluation to retrieve metric evaluation data stored in the cloud deployment repository as retrieved metric evaluation data; computing a set of metric-based DSL elements by matching the particular metric name and each possible metric value of the set of possible metric values to the retrieved metric evaluation data; and transmitting an auto-completion DSL query response including the set of metric-based DSL elements to the client system.

A fifth feature, combinable with any of the previous or following features, further comprising: receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular function name in a particular function of a set of functions, wherein each function of the set of functions including a function name, a set of possible function output values, and a set of function query instructions including search locations for metrics data associated with each function for each cloud system of the plurality of cloud systems stored in the cloud deployment repository: executing, by the DSL query system, the set of function query instructions of the particular function to retrieve function evaluation data stored in the cloud deployment repository as retrieved function evaluation data; computing a set of functional DSL elements by matching the particular function name and each possible function output value of the set of possible function output values to the retrieved function evaluation data; and transmitting an auto-completion DSL query response including the set of functional DSL elements to the client system.

A sixth feature, combinable with any of the previous or following features, further comprising: receiving, by the DSL query system, a second DSL query request including second DSL query input based on the DSL from the client system and an auto-completion indicator indicating that auto-completion results are to be returned for the second DSL query input; executing, by the DSL query system, a set of customer query instructions to retrieve customer data stored in the cloud deployment repository as retrieved customer data, wherein the customer data including a set of customers, each customer of the set of customers including a customer name; computing a set of customer names by matching the second DSL query input to a portion of a customer name of each customer of the set of customers in the retrieved customer data; and transmitting an auto-completion DSL query response including the set of customer names to the client system.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, by a domain specific language (DSL) query system, a first DSL query request including first DSL query input based on a DSL from a client system; translating, by the DSL query system, the first DSL query input to a first set of query instructions based on the first DSL query input, translation rules metadata, and the DSL; executing, by the DSL query system, the first set of query instructions as a complex query to retrieve, for each cloud system of a plurality of cloud systems in a cloud deployment, metrics data associated with an application state of an application deployed on each cloud system stored in a cloud deployment repository as retrieved metrics data; computing, by the DSL query system, a first set of response output by matching the retrieved metrics data from the cloud deployment repository to the first DSL query input based on the first DSL query input and the DSL; and transmitting, by the DSL query system, a first DSL query response including the first set of response output to the client system.

The foregoing and other described implementations can each, optionally, include one or more of the following features:

A first feature, combinable with any of the following features, further comprising: executing an update metrics data process comprising: retrieving, for each cloud system of the plurality of cloud systems, cloud system metrics data associated with the application state of the application deployed on each cloud system from each cloud system of the plurality of cloud systems as retrieved cloud systems metrics data; and updating, for each cloud system of the plurality of cloud systems, the metrics data stored in the cloud deployment repository with the retrieved cloud systems metrics data, and wherein the update metrics data process is executed periodically based on a programmable time period, a particular interval based on a programmable interval, or dynamically on demand.

A second feature, combinable with any of the previous or following features, wherein translating the first DSL query input further comprises: when the DSL query system determines that the first DSL query input includes a set of DSL elements based on the DSL: translating each DSL element of the set of DSL elements to a subset of DSL element query instructions of the set of query instructions based further on a DSL element type of each DSL element, wherein the DSL element type comprises a metric-based DSL element type or a functional DSL element type; and when the DSL query system determines that the first DSL query input includes a set of literals of literal type search terms based on the DSL: translating each literal of the set of literals to a subset of literal query instructions of the set of query instructions based further on each literal.

A third feature, combinable with any of the previous or following features, wherein the translation rules metadata includes at least one of: translation rules between a metric-based DSL element type DSL element associated with the DSL query input and a set of query instructions including search locations for metrics data for each cloud system of the plurality of cloud systems stored in the cloud deployment repository; translation rules between a functional DSL element type DSL element associated with DSL query input and a set of query instructions including search locations for the metrics data for each cloud system of the plurality of cloud systems stored in the cloud deployment repository; and translation rules between a literal associated with a literal type search term associated with the DSL query input and a set of query instructions including search locations for the literal in the cloud deployment repository.

A fourth feature, combinable with any of the previous or following features, further comprising: receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular metric name in a particular metric evaluation of a set of metric evaluations, wherein each metric evaluation of the set of metric evaluations including a metric name of an associated metric, a set of possible metric values of the associated metric, and a set of metric query instructions including search locations for metrics data of the associated metric for each cloud system of the plurality of cloud systems stored in the cloud deployment repository: executing, by the DSL query system, the set of metric query instructions of the particular metric evaluation to retrieve metric evaluation data stored in the cloud deployment repository as retrieved metric evaluation data; computing a set of metric-based DSL elements by matching the particular metric name and each possible metric value of the set of possible metric values to the retrieved metric evaluation data; and transmitting an auto-completion DSL query response including the set of metric-based DSL elements to the client system.

A fifth feature, combinable with any of the previous or following features, further comprising: receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular function name in a particular function of a set of functions, wherein each function of the set of functions including a function name, a set of possible function output values, and a set of function query instructions including search locations for metrics data associated with each function for each cloud system of the plurality of cloud systems stored in the cloud deployment repository: executing, by the DSL query system, the set of function query instructions of the particular function to retrieve function evaluation data stored in the cloud deployment repository as retrieved function evaluation data; computing a set of functional DSL elements by matching the particular function name and each possible function output value of the set of possible function output values to the retrieved function evaluation data; and transmitting an auto-completion DSL query response including the set of functional DSL elements to the client system.

A sixth feature, combinable with any of the previous or following features, further comprising: receiving, by the DSL query system, a second DSL query request including second DSL query input based on the DSL from the client system and an auto-completion indicator indicating that auto-completion results are to be returned for the second DSL query input; executing, by the DSL query system, a set of customer query instructions to retrieve customer data stored in the cloud deployment repository as retrieved customer data, wherein the customer data including a set of customers, each customer of the set of customers including a customer name; computing a set of customer names by matching the second DSL query input to a portion of a customer name of each customer of the set of customers in the retrieved customer data; and transmitting an auto-completion DSL query response including the set of customer names to the client system.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a domain specific language (DSL) query system, a first DSL query request including first DSL query input based on a DSL from a client system;
   translating, by the DSL query system, the first DSL query input to a first set of query instructions based on the first DSL query input, translation rules metadata, and the DSL;
   executing, by the DSL query system, the first set of query instructions as a complex query to retrieve, for each cloud system of a plurality of cloud systems in a cloud deployment, metrics data associated with an application state of an application deployed on each cloud system stored in a cloud deployment repository as retrieved metrics data, wherein the application state of the application deployed on each cloud system including the associated metrics data represent the state of the corresponding application deployed on each cloud system in real-time;

computing, by the DSL query system, a first set of response output by matching the retrieved metrics data from the cloud deployment repository to the first DSL query input based on the first DSL query input and the DSL;

transmitting, by the DSL query system, a first DSL query response including the first set of response output to the client system; and executing an update metrics data process, the update metrics data process comprising:

retrieving, for each cloud system of the plurality of cloud systems, cloud system metrics data associated with the application state of the application deployed on each cloud system from each cloud system of the plurality of cloud systems as retrieved cloud systems metrics data; and updating, for each cloud system of the plurality of cloud systems, the metrics data stored in the cloud deployment repository with the retrieved cloud systems metrics data, and wherein the update metrics data process is executed periodically based on a programmable time period, a particular interval based on a programmable interval, or dynamically on demand.

2. The computer-implemented method of claim 1, wherein translating the first DSL query input further comprises:

when the DSL query system determines that the first DSL query input includes a set of DSL elements based on the DSL:

translating each DSL element of the set of DSL elements to a subset of DSL element query instructions of the set of query instructions based further on a DSL element type of each DSL element, wherein the DSL element type comprises a metric-based DSL element type or a functional DSL element type; and when the DSL query system determines that the first DSL query input includes a set of literals of literal type search terms based on the DSL:

translating each literal of the set of literals to a subset of literal query instructions of the set of query instructions based further on each literal.

3. The computer-implemented method of claim 2, wherein the translation rules metadata includes at least one of:

translation rules between a metric-based DSL element type DSL element associated with the DSL query input and a set of query instructions including search locations for metrics data for each cloud system of the plurality of cloud systems stored in the cloud deployment repository;

translation rules between a functional DSL element type DSL element associated with DSL query input and a set of query instructions including search locations for the metrics data for each cloud system of the plurality of cloud systems stored in the cloud deployment repository; and translation rules between a literal associated with a literal type search term associated with the DSL query input and a set of query instructions including search locations for the literal in the cloud deployment repository.

4. The computer-implemented method of claim 1, further comprising:

receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular metric name in a particular metric evaluation of a set of metric evaluations, wherein each metric evaluation of the set of metric evaluations including a metric name of an associated metric, a set of possible metric values of the associated metric, and a set of metric query instructions including search locations for metrics data of the associated metric for each cloud system of the plurality of cloud systems stored in the cloud deployment repository:

executing, by the DSL query system, the set of metric query instructions of the particular metric evaluation to retrieve metric evaluation data stored in the cloud deployment repository as retrieved metric evaluation data;

computing a set of metric-based DSL elements by matching the particular metric name and each possible metric value of the set of possible metric values to the retrieved metric evaluation data; and transmitting an auto-completion DSL query response including the set of metric-based DSL elements to the client system.

5. The computer-implemented method of claim 1, further comprising:

receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular function name in a particular function of a set of functions, wherein each function of the set of functions including a function name, a set of possible function output values, and a set of function query instructions including search locations for metrics data associated with each function for each cloud system of the plurality of cloud systems stored in the cloud deployment repository:

executing, by the DSL query system, the set of function query instructions of the particular function to retrieve function evaluation data stored in the cloud deployment repository as retrieved function evaluation data;

computing a set of functional DSL elements by matching the particular function name and each possible function output value of the set of possible function output values to the retrieved function evaluation data; and transmitting an auto-completion DSL query response including the set of functional DSL elements to the client system.

6. The computer-implemented method of claim 1, further comprising:

receiving, by the DSL query system, a second DSL query request including second DSL query input based on the DSL from the client system and an auto-completion indicator indicating that auto-completion results are to be returned for the second DSL query input;

executing, by the DSL query system, a set of customer query instructions to retrieve customer data stored in the cloud deployment repository as retrieved customer data, wherein the customer data including a set of customers, each customer of the set of customers including a customer name;

computing a set of customer names by matching the second DSL query input to a portion of a customer name of each customer of the set of customers in the retrieved customer data; and transmitting an auto-completion DSL query response including the set of customer names to the client system.

7. A non-transitory, computer-readable medium storing one or more instructions executable by a computer system to perform operations comprising:

receiving, by a domain specific language (DSL) query system, a first DSL query request including first DSL query input based on a DSL from a client system;

translating, by the DSL query system, the first DSL query input to a first set of query instructions based on the first DSL query input, translation rules metadata, and the DSL;

executing, by the DSL query system, the first set of query instructions as a complex query to retrieve, for each cloud system of a plurality of cloud systems in a cloud deployment, metrics data associated with an application state of an application deployed on each cloud system stored in a cloud deployment repository as retrieved metrics data, wherein the application state of the application deployed on each cloud system including the associated metrics data represent the state of the corresponding application deployed on each cloud system in real-time;

computing, by the DSL query system, a first set of response output by matching the retrieved metrics data from the cloud deployment repository to the first DSL query input based on the first DSL query input and the DSL;

transmitting, by the DSL query system, a first DSL query response including the first set of response output to the client system; and executing an update metrics data process, the update metrics data process comprising:

retrieving, for each cloud system of the plurality of cloud systems, cloud system metrics data associated with the application state of the application deployed on each cloud system from each cloud system of the plurality of cloud systems as retrieved cloud systems metrics data; and updating, for each cloud system of the plurality of cloud systems, the metrics data stored in the cloud deployment repository with the retrieved cloud systems metrics data, and wherein the update metrics data process is executed periodically based on a programmable time period, a particular interval based on a programmable interval, or dynamically on demand.

8. The non-transitory, computer-readable medium of claim 7, wherein translating the first DSL query input further comprises:

when the DSL query system determines that the first DSL query input includes a set of DSL elements based on the DSL:

translating each DSL element of the set of DSL elements to a subset of DSL element query instructions of the set of query instructions based further on a DSL element type of each DSL element, wherein the DSL element type comprises a metric-based DSL element type or a functional DSL element type; and when the DSL query system determines that the first DSL query input includes a set of literals of literal type search terms based on the DSL:

translating each literal of the set of literals to a subset of literal query instructions of the set of query instructions based further on each literal.

9. The non-transitory, computer-readable medium of claim 8, wherein the translation rules metadata includes at least one of:

translation rules between a metric-based DSL element type DSL element associated with the DSL query input and a set of query instructions including search locations for metrics data for each cloud system of the plurality of cloud systems stored in the cloud deployment repository;

translation rules between a functional DSL element type DSL element associated with DSL query input and a set of query instructions including search locations for the metrics data for each cloud system of the plurality of cloud systems stored in the cloud deployment repository; and translation rules between a literal associated with a literal type search term associated with the DSL query input and a set of query instructions including search locations for the literal in the cloud deployment repository.

10. The non-transitory, computer-readable medium of claim 7, further comprising:

receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular metric name in a particular metric evaluation of a set of metric evaluations, wherein each metric evaluation of the set of metric evaluations including a metric name of an associated metric, a set of possible metric values of the associated metric, and a set of metric query instructions including search locations for metrics data of the associated metric for each cloud system of the plurality of cloud systems stored in the cloud deployment repository:

executing, by the DSL query system, the set of metric query instructions of the particular metric evaluation to retrieve metric evaluation data stored in the cloud deployment repository as retrieved metric evaluation data;

computing a set of metric-based DSL elements by matching the particular metric name and each possible metric value of the set of possible metric values to the retrieved metric evaluation data; and transmitting an auto-completion DSL query response including the set of metric-based DSL elements to the client system.

11. The non-transitory, computer-readable medium of claim 7, further comprising:

receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular function name in a particular function of a set of functions, wherein each function of the set of functions including a function name, a set of possible function output values, and a set of function query instructions including search locations for metrics data associated with each function for each cloud system of the plurality of cloud systems stored in the cloud deployment repository:

executing, by the DSL query system, the set of function query instructions of the particular function to retrieve function evaluation data stored in the cloud deployment repository as retrieved function evaluation data;

computing a set of functional DSL elements by matching the particular function name and each possible function output value of the set of possible function output values to the retrieved function evaluation data; and transmitting an auto-completion DSL query response including the set of functional DSL elements to the client system.

12. The non-transitory, computer-readable medium of claim 7, further comprising:

receiving, by the DSL query system, a second DSL query request including second DSL query input based on the DSL from the client system and an auto-completion indicator indicating that auto-completion results are to be returned for the second DSL query input;

executing, by the DSL query system, a set of customer query instructions to retrieve customer data stored in the cloud deployment repository as retrieved customer data, wherein the customer data including a set of customers, each customer of the set of customers including a customer name;

computing a set of customer names by matching the second DSL query input to a portion of a customer name of each customer of the set of customers in the retrieved customer data; and transmitting an auto-completion DSL query response including the set of customer names to the client system.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, by a domain specific language (DSL) query system, a first DSL query request including first DSL query input based on a DSL from a client system;

translating, by the DSL query system, the first DSL query input to a first set of query instructions based on the first DSL query input, translation rules metadata, and the DSL;

executing, by the DSL query system, the first set of query instructions as a complex query to retrieve, for each cloud system of a plurality of cloud systems in a cloud deployment, metrics data associated with an application state of an application deployed on each cloud system stored in a cloud deployment repository as retrieved metrics data, wherein the application state of the application deployed on each cloud system including the associated metrics data represent the state of the corresponding application deployed on each cloud system in real-time;

computing, by the DSL query system, a first set of response output by matching the retrieved metrics data from the cloud deployment repository to the first DSL query input based on the first DSL query input and the DSL;

transmitting, by the DSL query system, a first DSL query response including the first set of response output to the client system; and executing an update metrics data process, the update metrics data process comprising:

retrieving, for each cloud system of the plurality of cloud systems, cloud system metrics data associated with the application state of the application deployed on each cloud system from each cloud system of the plurality of cloud systems as retrieved cloud systems metrics data; and updating, for each cloud system of the plurality of cloud systems, the metrics data stored in the cloud deployment repository with the retrieved cloud systems metrics data, and wherein the update metrics data process is executed periodically based on a programmable time period, a particular interval based on a programmable interval, or dynamically on demand.

14. The computer-implemented system of claim 13, wherein translating the first DSL query input further comprises:

when the DSL query system determines that the first DSL query input includes a set of DSL elements based on the DSL:

translating each DSL element of the set of DSL elements to a subset of DSL element query instructions of the set of query instructions based further on a DSL element type of each DSL element, wherein the DSL element type comprises a metric-based DSL element type or a functional DSL element type; and when the DSL query system determines that the first DSL query input includes a set of literals of literal type search terms based on the DSL:

translating each literal of the set of literals to a subset of literal query instructions of the set of query instructions based further on each literal.

15. The computer-implemented system of claim 14, wherein the translation rules metadata includes at least one of:

translation rules between a metric-based DSL element type DSL element associated with the DSL query input and a set of query instructions including search locations for metrics data for each cloud system of the plurality of cloud systems stored in the cloud deployment repository;

translation rules between a functional DSL element type DSL element associated with DSL query input and a set of query instructions including search locations for the metrics data for each cloud system of the plurality of cloud systems stored in the cloud deployment repository; and translation rules between a literal associated with a literal type search term associated with the DSL query input and a set of query instructions including search locations for the literal in the cloud deployment repository.

16. The computer-implemented system of claim 13, further comprising:

receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular metric name in a particular metric evaluation of a set of metric evaluations, wherein each metric evaluation of the set of metric evaluations including a metric name of an associated metric, a set of possible metric values of the associated metric, and a set of metric query instructions including search locations for metrics data of the associated metric for each cloud system of the plurality of cloud systems stored in the cloud deployment repository:

executing, by the DSL query system, the set of metric query instructions of the particular metric evaluation to retrieve metric evaluation data stored in the cloud deployment repository as retrieved metric evaluation data;

computing a set of metric-based DSL elements by matching the particular metric name and each possible metric value of the set of possible metric values to the retrieved metric evaluation data; and transmitting an auto-completion DSL query response including the set of metric-based DSL elements to the client system.

17. The computer-implemented system of claim 13, further comprising:

receiving, by the DSL query system, a second DSL query request including second DSL query input based on the DSL from the client system and an auto-completion indicator indicating that auto-completion results are to be returned for the second DSL query input; and when the DSL query system determines that a portion of the second DSL query input matches a particular function name in a particular function of a set of functions, wherein each function of the set of functions including a function name, a set of possible function output values, and a set of function query instructions including search locations for metrics data associated with each function for each cloud system of the plurality of cloud systems stored in the cloud deployment repository:

executing, by the DSL query system, the set of function query instructions of the particular function to retrieve function evaluation data stored in the cloud deployment repository as retrieved function evaluation data;

computing a set of functional DSL elements by matching the particular function name and each possible function output value of the set of possible function output values to the retrieved function evaluation data; and transmitting an auto-completion DSL query response including the set of functional DSL elements to the client system.

* * * * *